United States Patent
Medlock

(10) Patent No.: US 7,200,629 B2
(45) Date of Patent: Apr. 3, 2007

(54) APPARATUS AND METHOD FOR FAST HADAMARD TRANSFORMS

(75) Inventor: Joel D. Medlock, Los Gatos, CA (US)

(73) Assignee: Infineon Technologies AG, Munich (DE)

(*) Notice: Subject to any disclaimer, the term of this patent is extended or adjusted under 35 U.S.C. 154(b) by 838 days.

(21) Appl. No.: 10/338,625

(22) Filed: Jan. 6, 2003

(65) Prior Publication Data

US 2003/0169939 A1    Sep. 11, 2003

Related U.S. Application Data

(60) Provisional application No. 60/346,143, filed on Jan. 4, 2002.

(51) Int. Cl.
*G06F 7/00* (2006.01)
*G06F 17/14* (2006.01)

(52) U.S. Cl. ..................... 708/201; 708/400

(58) Field of Classification Search ............. 708/400
See application file for complete search history.

(56) References Cited

U.S. PATENT DOCUMENTS

| | | | | |
|---|---|---|---|---|
| 3,586,837 A | * | 6/1971 | Hyatt et al. | 708/102 |
| 3,937,941 A | * | 2/1976 | Zemel et al. | 708/674 |
| 4,463,377 A | * | 7/1984 | Meyer-Ebrecht et al. | 375/240.18 |
| 4,675,837 A | * | 6/1987 | Ulbrich et al. | 708/714 |
| 2004/0006581 A1 | * | 1/2004 | Nakayama | 708/400 |

* cited by examiner

*Primary Examiner*—Tan V. Mai
(74) *Attorney, Agent, or Firm*—Dickstein Shapiro LLP

(57) ABSTRACT

A Fast Hadamard Transform generator serially performs a Fast Hadamard Transform of a sampled signal from a first channel. The Fast Hadamard Transform generator comprises a series of stages. Each stage includes a shift register for serially receiving samples of the signal. Each stage further includes a two's complement generator for producing a two's complement of a first sample of the signal and a first multiplexer for selecting between a first sample of the signal and the two's complement of the first sample. A first adder then generates a sum of a second sample of the signal and the first sample and a difference of the second sample and the first sample and supplies the sum and the difference to the shift register of the next stage. In one embodiment the shift registers are implemented in random access memory.

45 Claims, 12 Drawing Sheets

Table 2-1

| 104-1 | 104-2 | 104-3 | 104-4 |
|---|---|---|---|
| B | $y_{2(BA)}$ | $y_{4(xxxx)}$ | $y_{8(xxxxxxx)}$ |
| A | $y_{2(xx)}$ | $y_{4(xxxx)}$ | $y_{8(xxxxxxx)}$ |
|   | $y_{2(xx)}$ | $y_{4(xxxx)}$ | $y_{8(xxxxxxx)}$ |
|   |   | $y_{4(xxxx)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-2

| 104-1 | 104-2 | 104-3 | 104-4 |
|---|---|---|---|
| B | $y_{2(B\bar{A})}$ | $y_{4(xxxx)}$ | $y_{8(xxxxxxx)}$ |
| A | $y_{2(BA)}$ | $y_{4(xxxx)}$ | $y_{8(xxxxxxx)}$ |
|   | $y_{2(xx)}$ | $y_{4(xxxx)}$ | $y_{8(xxxxxxx)}$ |
|   |   | $y_{4(xxxx)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-3

| 104-1 | 104-2 | 104-3 | 104-4 |
|---|---|---|---|
| D | $y_{2(DC)}$ | $y_{4(DCBA)}$ | $y_{8(xxxxxxx)}$ |
| C | $y_{2(B\bar{A})}$ | $y_{4(xxxx)}$ | $y_{8(xxxxxxx)}$ |
|   | $y_{2(BA)}$ | $y_{4(xxxx)}$ | $y_{8(xxxxxxx)}$ |
|   |   | $y_{4(xxxx)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-4

| 104-1 | 104-2 | 104-3 | 104-4 |
|---|---|---|---|
| D | $y_{2(DC)}$ | $y_{4(DC\bar{BA})}$ | $y_{8(xxxxxxx)}$ |
| C | $y_{2(B\bar{A})}$ | $y_{4(DCBA)}$ | $y_{8(xxxxxxx)}$ |
|   | $y_{2(BA)}$ | $y_{4(xxxx)}$ | $y_{8(xxxxxxx)}$ |
|   |   | $y_{4(xxxx)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-5

| 104-1 | 104-2 | 104-3 | 104-4 |
|---|---|---|---|
| D | $y_{2(D\bar{C})}$ | $y_{4(DCB\bar{A})}$ | $y_{8(xxxxxxx)}$ |
| C | $y_{2(DC)}$ | $y_{4(DC\bar{BA})}$ | $y_{8(xxxxxxx)}$ |
|   | $y_{2(B\bar{A})}$ | $y_{4(DCBA)}$ | $y_{8(xxxxxxx)}$ |
|   |   | $y_{4(xxxx)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-6

| 104-1 | 104-2 | 104-3 | 104-4 |
|---|---|---|---|
| D | $y_{2(D\bar{C})}$ | $y_{4(D\bar{C}\bar{B}\bar{A})}$ | $y_{8(xxxxxxx)}$ |
| C | $y_{2(DC)}$ | $y_{4(D\bar{C}BA)}$ | $y_{8(xxxxxxx)}$ |
|   | $y_{2(B\bar{A})}$ | $y_{4(DC\bar{BA})}$ | $y_{8(xxxxxxx)}$ |
|   |   | $y_{4(DCBA)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-7

| 104-1 | 104-2 | 104-3 | 104-4 |
|---|---|---|---|
| F | $y_{2(FE)}$ | $y_{4(D\bar{C}B\bar{A})}$ | $y_{8(xxxxxxx)}$ |
| E | $y_{2(D\bar{C})}$ | $y_{4(D\bar{C}B\bar{A})}$ | $y_{8(xxxxxxx)}$ |
|   | $y_{2(DC)}$ | $y_{4(DC\bar{BA})}$ | $y_{8(xxxxxxx)}$ |
|   |   | $y_{4(DCBA)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Table 2-8

| 104-1 | 104-2 | 104-3 | 104-4 |
|---|---|---|---|
| F | $y_{2(F\bar{E})}$ | $y_{4(D\bar{C}B\bar{A})}$ | $y_{8(xxxxxxx)}$ |
| E | $y_{2(FE)}$ | $y_{4(D\bar{C}B\bar{A})}$ | $y_{8(xxxxxxx)}$ |
|   | $y_{2(DC)}$ | $y_{4(DC\bar{BA})}$ | $y_{8(xxxxxxx)}$ |
|   |   | $y_{4(DCBA)}$ | $y_{8(xxxxxxx)}$ |
|   |   | $y_{4(xxxx)}$ | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |
|   |   |   | $y_{8(xxxxxxx)}$ |

Figure 2C-1

| 104-1 | 104-2 | 104-3 | 104-4 |
|---|---|---|---|
| H | $y_{2(HG)}$ | $y_{4(HGFE)}$ | $y_{8(HGFEDCBA)}$ |
| G | $y_{2(F\overline{E})}$ | $y_{4(D\overline{CBA})}$ | $y_{8(xxxxxxx)}$ |
|  | $y_{2(FE)}$ | $y_{4(D\overline{CB}A)}$ | $y_{8(xxxxxxx)}$ |
|  |  | $y_{4(DC\overline{BA})}$ | $y_{8(xxxxxxx)}$ |
|  |  | $y_{4(DCBA)}$ | $y_{8(xxxxxxx)}$ |
|  |  |  | $y_{8(xxxxxxx)}$ |
|  |  |  | $y_{8(xxxxxxx)}$ |
|  |  |  | $y_{8(xxxxxxx)}$ |
| Table 2-9 |  |  | $y_{8(xxxxxxx)}$ |

| 104-1 | 104-2 | 104-3 | 104-4 |
|---|---|---|---|
| H | $y_{2(HG)}$ | $y_{4(HGFE)}$ | $y_{8(HGFE\,\overline{DCBA})}$ |
| G | $y_{2(F\overline{E})}$ | $y_{4(D\overline{CBA})}$ | $y_{8(HGFEDCBA)}$ |
|  | $y_{2(FE)}$ | $y_{4(D\overline{CB}A)}$ | $y_{8(xxxxxxx)}$ |
|  |  | $y_{4(DC\overline{BA})}$ | $y_{8(xxxxxxx)}$ |
|  |  | $y_{4(DCBA)}$ | $y_{8(xxxxxxx)}$ |
|  |  |  | $y_{8(xxxxxxx)}$ |
|  |  |  | $y_{8(xxxxxxx)}$ |
|  |  |  | $y_{8(xxxxxxx)}$ |
| Table 2-10 |  |  | $y_{8(xxxxxxx)}$ |

| 104-1 | 104-2 | 104-3 | 104-4 |
|---|---|---|---|
| H | $y_{2(HG)}$ | $y_{4(HG\,\overline{FE})}$ | $y_{8(HG\overline{FE}DCBA)}$ |
| G | $y_{2(F\overline{E})}$ | $y_{4(HGFE)}$ | $y_{8(HGFE\overline{DCBA})}$ |
|  | $y_{2(FE)}$ | $y_{4(D\overline{CBA})}$ | $y_{8(HGFEDCBA)}$ |
|  |  | $y_{4(D\overline{CB}A)}$ | $y_{8(xxxxxxx)}$ |
|  |  | $y_{4(DC\overline{BA})}$ | $y_{8(xxxxxxx)}$ |
|  |  |  | $y_{8(xxxxxxx)}$ |
|  |  |  | $y_{8(xxxxxxx)}$ |
|  |  |  | $y_{8(xxxxxxx)}$ |
| Table 2-11 |  |  | $y_{8(xxxxxxx)}$ |

| 104-1 | 104-2 | 104-3 | 104-4 |
|---|---|---|---|
| H | $y_{2(HG)}$ | $y_{4(HG\,\overline{FE})}$ | $y_{8(HG\overline{FE}DCBA)}$ |
| G | $y_{2(F\overline{E})}$ | $y_{4(HGFE)}$ | $y_{8(HG\overline{FE}DCBA)}$ |
|  | $y_{2(FE)}$ | $y_{4(D\overline{CBA})}$ | $y_{8(HGFEDCBA)}$ |
|  |  | $y_{4(D\overline{CB}A)}$ | $y_{8(HGFEDCBA)}$ |
|  |  | $y_{4(DC\overline{BA})}$ | $y_{8(xxxxxxx)}$ |
|  |  |  | $y_{8(xxxxxxx)}$ |
|  |  |  | $y_{8(xxxxxxx)}$ |
|  |  |  | $y_{8(xxxxxxx)}$ |
| Table 2-12 |  |  | $y_{8(xxxxxxx)}$ |

| 104-1 | 104-2 | 104-3 | 104-4 |
|---|---|---|---|
| H | $y_{2(H\overline{G})}$ | $y_{4(H\overline{GFE})}$ | $y_{8(H\overline{GFEDCBA})}$ |
| G | $y_{2(HG)}$ | $y_{4(HG\,\overline{FE})}$ | $y_{8(HGFEDCBA)}$ |
|  | $y_{2(F\overline{E})}$ | $y_{4(HGFE)}$ | $y_{8(HGFEDCBA)}$ |
|  |  | $y_{4(D\overline{CBA})}$ | $y_{8(HGFEDCBA)}$ |
|  |  | $y_{4(D\overline{CB}A)}$ | $y_{8(HGFEDCBA)}$ |
|  |  |  | $y_{8(xxxxxxx)}$ |
|  |  |  | $y_{8(xxxxxxx)}$ |
|  |  |  | $y_{8(xxxxxxx)}$ |
| Table 2-13 |  |  | $y_{8(xxxxxxx)}$ |

| 104-1 | 104-2 | 104-3 | 104-4 |
|---|---|---|---|
| H | $y_{2(H\overline{G})}$ | $y_{4(H\overline{G}F\overline{E})}$ | $y_{8(H\overline{GFEDCBA})}$ |
| G | $y_{2(HG)}$ | $y_{4(HG\,\overline{FE})}$ | $y_{8(H\overline{GFEDCBA})}$ |
|  | $y_{2(F\overline{E})}$ | $y_{4(HGFE)}$ | $y_{8(H\overline{GFEDCBA})}$ |
|  |  | $y_{4(D\overline{CB}A)}$ | $y_{8(H\overline{GFEDCBA})}$ |
|  |  | $y_{4(D\overline{CB}A)}$ | $y_{8(HGFEDCBA)}$ |
|  |  |  | $y_{8(HGFEDCBA)}$ |
|  |  |  | $y_{8(xxxxxxx)}$ |
|  |  |  | $y_{8(xxxxxxx)}$ |
| Table 2-14 |  |  | $y_{8(xxxxxxx)}$ |

| 104-1 | 104-2 | 104-3 | 104-4 |
|---|---|---|---|
| H | $y_{2(H\overline{G})}$ | $y_{4(H\,\overline{G}F\overline{E})}$ | $y_{8(H\overline{GFE}DC\overline{BA})}$ |
| G | $y_{2(HG)}$ | $y_{4(H\,\overline{G}F\overline{E})}$ | $y_{8(H\overline{GFE}DC\overline{BA})}$ |
|  | $y_{2(F\overline{E})}$ | $y_{4(HG\,\overline{FE})}$ | $y_{8(H\overline{GFE}DC\overline{BA})}$ |
|  |  | $y_{4(HGFE)}$ | $y_{8(H\overline{GFE}DC\overline{BA})}$ |
|  |  | $y_{4(D\overline{CB}A)}$ | $y_{8(HGFEDCBA)}$ |
|  |  |  | $y_{8(HGFEDCBA)}$ |
|  |  |  | $y_{8(HGFEDCBA)}$ |
|  |  |  | $y_{8(xxxxxxx)}$ |
| Table 2-15 |  |  | $y_{8(xxxxxxx)}$ |

| 104-1 | 104-2 | 104-3 | 104-4 |
|---|---|---|---|
| H | $y_{2(H\overline{G})}$ | $y_{4(H\,\overline{G}F\overline{E})}$ | $y_{8(H\overline{GFEDCBA})}$ |
| G | $y_{2(HG)}$ | $y_{4(H\,\overline{G}F\overline{E})}$ | $y_{8(H\overline{GFEDCBA})}$ |
|  | $y_{2(F\overline{E})}$ | $y_{4(HG\,\overline{FE})}$ | $y_{8(H\overline{GFEDCBA})}$ |
|  |  | $y_{4(HGFE)}$ | $y_{8(H\overline{GFEDCBA})}$ |
|  |  | $y_{4(D\overline{CB}A)}$ | $y_{8(H\overline{GFEDCBA})}$ |
|  |  |  | $y_{8(H\overline{GFEDC}BA)}$ |
|  |  |  | $y_{8(H\overline{GFEDC}BA)}$ |
|  |  |  | $y_{8(HGFEDCBA)}$ |
| Table 2-16 |  |  | $y_{8(xxxxxxx)}$ |

Figure 2C-2

Table 2-17

| 104-1 | 104-2 | 104-3 | 104-4 |
|---|---|---|---|
| J | $y_{2(JI)}$ | $y_{4(H\overline{GFE})}$ | $y_{8(HGFED\overline{CBA})}$ |
| I | $y_{2(H\overline{G})}$ | $y_{4(H\overline{GFE})}$ | $y_{8(HGFED\overline{CBA})}$ |
|  | $y_{2(HG)}$ | $y_{4(HG\overline{FE})}$ | $y_{8(HGFED\overline{CBA})}$ |
|  |  | $y_{4(HGFE)}$ | $y_{8(HGFED\overline{CBA})}$ |
|  |  | $y_{4(D\overline{CBA})}$ | $y_{8(HGFED\overline{CBA})}$ |
|  |  |  | $y_{8(HGFEDCBA)}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-18

| 104-1 | 104-2 | 104-3 | 104-4 |
|---|---|---|---|
| J | $y_{2(J\overline{I})}$ | $y_{4(H\overline{GFE})}$ | $y_{8(HGFED\overline{CBA})}$ |
| I | $y_{2(JI)}$ | $y_{4(H\overline{GFE})}$ | $y_{8(HGFED\overline{CBA})}$ |
|  | $y_{2(H\overline{G})}$ | $y_{4(HG\overline{FE})}$ | $y_{8(HGFED\overline{CBA})}$ |
|  |  | $y_{4(HGFE)}$ | $y_{8(HGFED\overline{CBA})}$ |
|  |  | $y_{4(D\overline{CBA})}$ | $y_{8(HGFED\overline{CBA})}$ |
|  |  |  | $y_{8(HGFEDCBA)}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-19

| 104-1 | 104-2 | 104-3 | 104-4 |
|---|---|---|---|
| L | $y_{2(LK)}$ | $y_{4(LKJI)}$ | $y_{8(HGFED\overline{CBA})}$ |
| K | $y_{2(JI)}$ | $y_{4(H\overline{GFE})}$ | $y_{8(HGFED\overline{CBA})}$ |
|  | $y_{2(JI)}$ | $y_{4(H\overline{GFE})}$ | $y_{8(HGFED\overline{CBA})}$ |
|  |  | $y_{4(HG\overline{FE})}$ | $y_{8(HGFED\overline{CBA})}$ |
|  |  | $y_{4(HGFE)}$ | $y_{8(HGFED\overline{CBA})}$ |
|  |  |  | $y_{8(HGFEDCBA)}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-20

| 104-1 | 104-2 | 104-3 | 104-4 |
|---|---|---|---|
| L | $y_{2(LK)}$ | $y_{4(LK\overline{JI})}$ | $y_{8(HGFED\overline{CBA})}$ |
| K | $y_{2(\overline{JI})}$ | $y_{4(LKJI)}$ | $y_{8(HGFED\overline{CBA})}$ |
|  | $y_{2(JI)}$ | $y_{4(H\overline{GFE})}$ | $y_{8(HGFED\overline{CBA})}$ |
|  |  | $y_{4(H\overline{GFE})}$ | $y_{8(HGFED\overline{CBA})}$ |
|  |  | $y_{4(HG\overline{FE})}$ | $y_{8(HGFED\overline{CBA})}$ |
|  |  |  | $y_{8(HGFED\overline{CBA})}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-21

| 104-1 | 104-2 | 104-3 | 104-4 |
|---|---|---|---|
| L | $y_{2(L\overline{K})}$ | $y_{4(LKJI)}$ | $y_{8(HGFED\overline{CBA})}$ |
| K | $y_{2(LK)}$ | $y_{4(LK\overline{JI})}$ | $y_{8(HGFED\overline{CBA})}$ |
|  | $y_{2(\overline{JI})}$ | $y_{4(LKJI)}$ | $y_{8(HGFED\overline{CBA})}$ |
|  |  | $y_{4(H\overline{GFE})}$ | $y_{8(HGFED\overline{CBA})}$ |
|  |  | $y_{4(H\overline{GFE})}$ | $y_{8(HGFED\overline{CBA})}$ |
|  |  |  | $y_{8(HGFED\overline{CBA})}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-22

| 104-1 | 104-2 | 104-3 | 104-4 |
|---|---|---|---|
| L | $y_{2(L\overline{K})}$ | $y_{4(LK\overline{JI})}$ | $y_{8(HGFED\overline{CBA})}$ |
| K | $y_{2(LK)}$ | $y_{4(LKJI)}$ | $y_{8(HGFED\overline{CBA})}$ |
|  | $y_{2(\overline{JI})}$ | $y_{4(LK\overline{JI})}$ | $y_{8(HGFED\overline{CBA})}$ |
|  |  | $y_{4(LKJI)}$ | $y_{8(HGFED\overline{CBA})}$ |
|  |  | $y_{4(H\overline{GFE})}$ | $y_{8(HGFED\overline{CBA})}$ |
|  |  |  | $y_{8(HGFED\overline{CBA})}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-23

| 104-1 | 104-2 | 104-3 | 104-4 |
|---|---|---|---|
| N | $y_{2(NM)}$ | $y_{4(LK\overline{JI})}$ | $y_{8(HGFED\overline{CBA})}$ |
| M | $y_{2(L\overline{K})}$ | $y_{4(LK\overline{JI})}$ | $y_{8(HGFED\overline{CBA})}$ |
|  | $y_{2(LK)}$ | $y_{4(LK\overline{JI})}$ | $y_{8(HGFED\overline{CBA})}$ |
|  |  | $y_{4(LKJI)}$ | $y_{8(HGFED\overline{CBA})}$ |
|  |  | $y_{4(H\overline{GFE})}$ | $y_{8(HGFED\overline{CBA})}$ |
|  |  |  | $y_{8(HGFED\overline{CBA})}$ |
|  |  |  | $y_{8(HGFED\overline{CBA})}$ |
|  |  |  | $y_{8(HGFEDCBA}$ |
|  |  |  | $y_{8(xxxxxxx)}$ |

Table 2-24

| 104-1 | 104-2 | 104-3 | 104-4 |
|---|---|---|---|
| N | $y_{2(N\overline{M})}$ | $y_{4(LKJI)}$ | $y_{8(HGFED\overline{CBA})}$ |
| M | $y_{2(NM)}$ | $y_{4(LK\overline{JI})}$ | $y_{8(HGFED\overline{CBA})}$ |
|  | $y_{2(L\overline{K})}$ | $y_{4(LK\overline{JI})}$ | $y_{8(HGFED\overline{CBA})}$ |
|  |  | $y_{4(LKJI)}$ | $y_{8(HGFED\overline{CBA})}$ |
|  |  | $y_{4(H\overline{GFE})}$ | $y_{8(HGFED\overline{CBA})}$ |
|  |  |  | $y_{8(HGFED\overline{CBA})}$ |
|  |  |  | $y_{8(HGFED\overline{CBA})}$ |
|  |  |  | $y_{8(HGFEDCBA}$ |
|  |  |  | $y_{8(xxxxxxx)}$ |

Figure 2C-3

| 104-1 | 104-2 | 104-3 | 104-4 |
|---|---|---|---|
| P | $y_{2(PO)}$ | $y_{4(PONM)}$ | $y_{8(PONMLKJI)}$ |
| O | $y_{2(N\overline{M})}$ | $y_{4(L\overline{K}\overline{J}\overline{I})}$ | $y_{8(\overline{HGFEDCBA})}$ |
| | $y_{2(NM)}$ | $y_{4(L\overline{K}J\overline{I})}$ | $y_{8(H\overline{GF}E\overline{DC}BA)}$ |
| | | $y_{4(LK\overline{JI})}$ | $y_{8(H\overline{GF}E\overline{DC}BA)}$ |
| | | $y_{4(LKJI)}$ | $y_{8(H\overline{GF}EDCBA)}$ |
| | | | $y_{8(HGF\overline{ED}CBA)}$ |
| | | | $y_{8(HGFE\overline{DC}BA)}$ |
| | | | $y_{8(HGFED\overline{CB}A)}$ |
| Table 2-25 | | | $y_{8(HGFEDCBA)}$ |

| 104-1 | 104-2 | 104-3 | 104-4 |
|---|---|---|---|
| P | $y_{2(PO)}$ | $y_{4(PONM)}$ | $y_{8(PONM\overline{LKJI})}$ |
| O | $y_{2(N\overline{M})}$ | $y_{4(L\overline{K}\overline{J}\overline{I})}$ | $y_{8(PONMLKJI)}$ |
| | $y_{2(NM)}$ | $y_{4(L\overline{K}J\overline{I})}$ | $y_{8(\overline{HGFEDCBA})}$ |
| | | $y_{4(LK\overline{JI})}$ | $y_{8(H\overline{GF}E\overline{DC}BA)}$ |
| | | $y_{4(LKJI)}$ | $y_{8(H\overline{GF}EDCBA)}$ |
| | | | $y_{8(HGF\overline{ED}CBA)}$ |
| | | | $y_{8(HGFE\overline{DC}BA)}$ |
| | | | $y_{8(HGFED\overline{CB}A)}$ |
| Table 2-26 | | | $y_{8(HGFEDCBA)}$ |

Figure 2C-4

APPARATUS AND METHOD FOR FAST HADAMARD TRANSFORMS

CROSS-REFERENCE TO RELATED APPLICATIONS

This application claims priority to the provisional patent application Ser. No. 60/346,143 filed on Jan. 4, 2002.

BRIEF DESCRIPTION OF THE INVENTION

This invention relates generally to digital communication systems. More particularly, the invention is directed toward a technique for serially performing a Fast Hadamard Transform (FHT).

BACKGROUND OF THE INVENTION

A Hadamard Transform is obtained by multiplying a Hadamard matrix by a vector. A Hadamard matrix is a square array of positive and negative ones whose rows (and columns) are mutually orthogonal. By mutually orthogonal is meant that the sum of the products of each element of a row (or column) with the corresponding element of another row (or column) is zero. Since the elements of a Hadamard matrix have only two possible values, the orthogonality property requires that half the elements in a row (or column) have the same value as the corresponding elements in any other row (or column) and half have the opposite value. Conversely, the sum of the products of each element of a row (or column) with the same element in the same row (or column) is equal to the number of elements in the row (or column).

The fundamental Hadamard matrix, $H_2$, is a 2×2 array where the subscript of H is the size of the matrix (i.e., the number of its rows and columns). In what is known as normal form, the fundamental Hadamard matrix is written so that its first row and first column contain only positive ones:

$$H_2 = \begin{bmatrix} +1 & +1 \\ +1 & -1 \end{bmatrix} \quad (1)$$

Larger Hadamard matrices are generated recursively using the recursion $$H_{2^n} = H_2 \otimes H_{2^{(n-1)}} \quad (2)$$

where ⊗ is a mathematical operator known as the Kronecker product. The Kronecker product multiplies each of the elements of the matrix to the left of the ⊗ operator (i.e., the four entries in the fundamental matrix $H_2$) with the matrix $H_{2^{(n-1)}}$ to the right of the ⊗ operator. Thus, in equation 2, the Kronecker product replaces each of the four entries in the fundamental matrix $H_2$ with the matrix $H_{2^{(n-1)}}$ multiplied by +1 or −1 depending on the sign of the entry in the fundamental matrix. For example, $$H_4 = H_2 \otimes H_2 = \begin{bmatrix} +1 & +1 \\ +1 & -1 \end{bmatrix} \otimes \begin{bmatrix} +1 & +1 \\ +1 & -1 \end{bmatrix} \quad (3)$$

$$= \begin{bmatrix} +1 & +1 & +1 & +1 \\ +1 & -1 & +1 & -1 \\ +1 & +1 & -1 & -1 \\ +1 & -1 & -1 & +1 \end{bmatrix} = \begin{bmatrix} H_2 & H_2 \\ H_2 & -H_2 \end{bmatrix}$$

Since the only values in the fundamental Hadamard matrix are +1 and −1, the values of any Hadamard matrix can only be +1 or −1. Frequently, other binary expressions are used in place of +1 and −1. For example, a plus sign and a minus sign can be used in place of +1 and −1, respectively; black and white squares can be used instead of +1 and −1 to provide a visual representation of the matrix; and for signaling applications +1 is replaced by a logic 0 and −1 by a logic 1.

The strict binary nature of the Hadamard matrix helps it and related mathematical expressions such as Walsh matrices find wide application in digital communications. A leading example is the CDMA cellular standard, IS-95 which uses a 64×64 Hadamard matrix, $H_{64}$. The $H_{64}$ matrix is reproduced at pages 449–450 of J. S. Lee & L. E. Miller, *CDMA Systems Engineering Handbook* (Artech, 1998).

Different properties of the Hadamard matrix are used in base-to-mobile (forward channel) and mobile-to-base (reverse channel) transmissions in CDMA telephony. The forward channel employs the Hadamard matrix for two purposes. First, each base station uses it to separate outbound transmissions targeted for different mobile users. Second, the base station employs it to spread the signal bandwidth of the transmission.

In the reverse channel, for every six information bits generated at the mobile radio, the mobile radio transmits one 64-bit row of the Hadamard matrix. Each such row is referred to as a Hadamard (or Walsh) sequence. The mobile radio uses the six data bits as a binary address in a lookup-table to select one of the Hadamard matrix rows, and it substitutes the 64 bits of this row for the six data bits. This action both encodes and spreads the signal, as in the forward link, but by a smaller spreading factor, 64/6=10.67.

This encoding acts primarily as a robust error-correction scheme that a mobile radio can perform efficiently and cheaply. When the base station receives the encoded signal, it uses an inverse Hadamard transform to decode the data. Because the data bits are unknown, the base station multiplies a column vector of every 64 received symbols by the entire 64×64 Hadamard matrix, $H_{64}$. The result is another column vector of 64 values. Mathematically, this operation is represented as the product of the Hadamard matrix H with the input vector x, yielding the Hadamard transform, y:

$$y = H_{64} x \quad (4)$$

Since the received symbols should be one row of the $H_{64}$ matrix, they should be orthogonal to all the rows except one of the $H_{64}$ matrix. Thus, all the rows except one of the resulting column vector should ideally have a zero value and the row that corresponded to the 64 received symbols should be identifiable by the presence of a non-zero value that is the sum of the absolute value of the 64 received symbols. The number of that row, represented in binary, yields the six data bits sent.

Multiplication of two matrices ordinarily requires each element of the first matrix to be multiplied by one of the elements in each column of the second matrix. Thus, when a square matrix of size N is multiplied by a column vector, the number of multiplications ordinarily required is $N^2$.

Certain symmetries of the Hadamard matrix are used in a reorganization of the computation algorithm such that the total number of functions required is reduced to $\log 2(N)*N$. An algorithm utilizing this reorganization is referred to as Fast Hadamard Transform (FHT). In prior art implementations of the Hadamard transform, all N inputs of the column vector must be present before the Hadamard transform operation can be performed. Other prior art Hadamard transform implementations use parallel techniques that require storing multiple data samples prior to calculation of the transform. Computer implementations of parallel Hadamard transform engines are thus subject to high memory requirements and latency, and similarly high power consumption.

In view of the foregoing, it is highly desirable to improve the implementation of a Hadamard transform, while reducing the resources used to implement the transform.

SUMMARY OF THE INVENTION

A Fast Hadamard Transform generator according to an embodiment of the invention, serially performs a Fast Hadamard Transform of a sampled signal from a first channel. The Fast Hadamard Transform generator comprises a series of stages. Each stage includes a shift register for serially receiving samples of the signal. Each stage further includes a two's complement generator for producing a two's complement of a first sample of the signal and a first multiplexer for selecting between a first sample of the signal and the two's complement of the first sample. A first adder generates a sum of a second sample of the signal and the first sample and a difference of the second sample and first sample and supplies the sum and the difference to the shift register of the next stage. In one embodiment of the invention, the shift registers are implemented in a random access memory.

BRIEF DESCRIPTION OF THE DRAWINGS

For a better understanding of the invention, reference should be made to the following detailed description taken in conjunction with the accompanying drawings, in which:

FIGS. 2C-1 to 2C-4 contain various tables showing the states of the various shift registers of FIG. 2A in accordance with an embodiment of the invention;

FIG. 3 is a block diagram of a shift register implemented using a counter and a synchronous RAM in accordance with an embodiment of the invention;

FIG. 4 is a block diagram of an FHT generator for performing a Fast Hadamard Transform wherein shift registers are implemented with random access memories in accordance with an embodiment of the invention;

Like reference numerals refer to corresponding parts throughout the drawings.

DETAILED DESCRIPTION OF THE INVENTION

Figure 1:
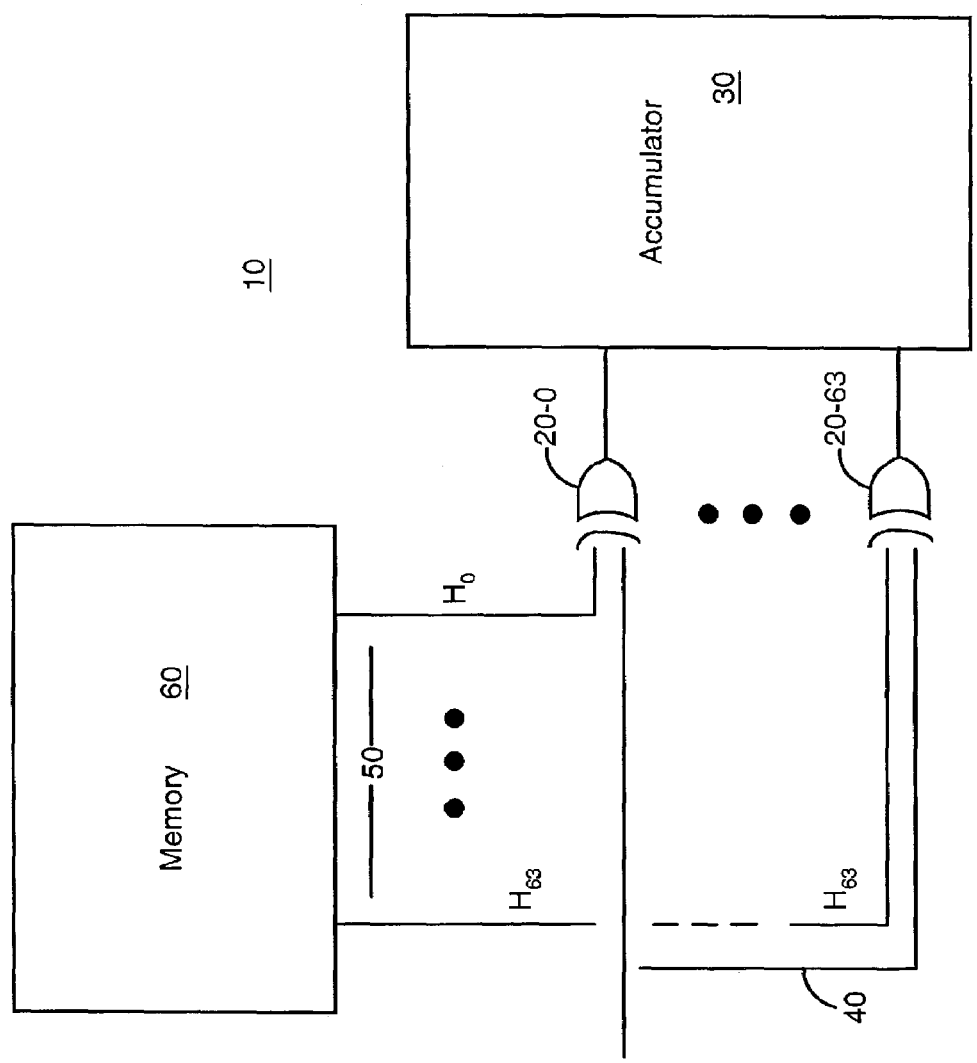
FIG. 1 is a block diagram of an FHT generator for performing a Fast Hadamard Transform in parallel.

FIG. 1 is a block diagram of a parallel Fast Hadamard Transform generator 10. For purposes of illustration, FHT generator 10 is depicted as performing a Hadamard transform which is a $H_{N=64}$ matrix multiplication but the invention may also be practiced on Hadamard matrices of any size N. Generator 10 comprises 64 exclusive OR (XOR) gates 20-0 through 20-63 and a 64 channel accumulator 30. One input to the XOR gates is a 64 bit long serial input data signal that is applied via input lead 40 one bit at a time in parallel to one input of each of the XOR gates 20-0 through 20-63. Illustratively, this signal has been received at generator 10 after transmission over a communication channel and it is known that the signal as transmitted was one of the 64 Hadamard sequences of the $H_{64}$ matrix. A second input to each of the XOR gates is a 64 bit long Hadamard sequence, $H_i$, with a different Hadamard sequence being applied one bit at a time in parallel to each of the 64 XOR gates. The Hadamard sequences $H_0$–$H_{63}$ are obtained on leads 50 from a 4096 bit memory 60 that stores the bit-values of the Hadamard matrix $H_{64}$.

The XOR gates produce output signals in accordance with the familiar exclusive OR truth table. If the two inputs to an XOR gate are the same, the output is a logic 0 and if the two inputs are different, the output is a logic 1. The outputs signals from each XOR gate are provided to accumulator 30 where the outputs of each XOR gate are summed separately, each in a different channel of the accumulator. Thus, each channel of the accumulator is associated with one XOR gate and therefore with the specific Hadamard sequence applied to that XOR gate. Since the input data signal should also be a Hadamard sequence, the two inputs to one of the 64 XOR gates should always be the same and the outputs of that XOR gate should always be logic 0. For each of the other XOR gates the two inputs should be same only half the time so that half the outputs should be logic 0 and half logic 1. Thus, upon converting the logic 0 values to an arithmetic value of 1 and the logic 1 value to an arithmetic value of –1, the accumulator will ideally accumulate in one channel a value of 64 for the output from one of the XOR gates and in the other channels a value of 0 for the outputs from all the other XOR gates. Thus, the particular Hadamard sequence that was transmitted can be identified by identifying the channel in the accumulator that stores the highest value and then ascertaining the Hadamard sequence that was supplied to the XOR gate that supplied signals to that channel. Even if the received data signal has been corrupted in transmission and is not a Hadamard sequence, the received signal should be close enough to the Hadamard sequence that was transmitted that the accumulated output from one of the XOR gates will be readily distinguished from the outputs of all the other XOR gates and will identify the Hadamard sequence that was transmitted.

The FHT generator of FIG. 1 is described as processing logic level data (ones and zeroes). However, it can be modified to accept signed binary data by replacing the XOR gates with conditional numeric complementer circuits such that when each of the signals $H_0$–$H_{63}$ is not asserted, the data 40 of FIG. 1 is passed through to the accumulator 30. When each of the signals $H_0$–$H_{63}$ is asserted, the data 40 of FIG. 1 is numerically complemented (typically two's complemented) and passed through to the accumulator 30. The width of the data accumulator 30 must process and hold will be increased from that required in the logic level case.

While FHT generator 10 of FIG. 1 is quite fast, it is hardware intensive, requiring 4K of memory to store the Hadamard matrix as well as a 64 channel accumulator. We have found that an alternative is to store the Hadamard matrix in the processing algorithm itself.

Figure 2A:
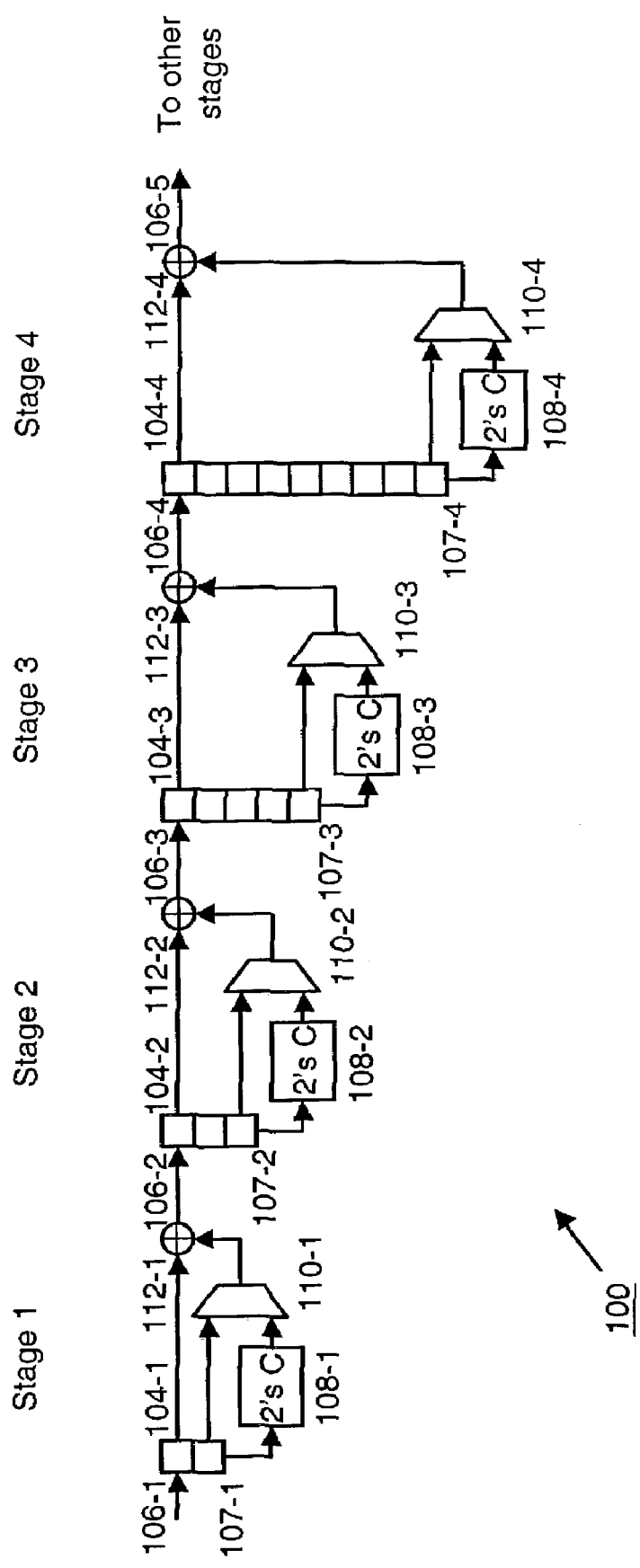
FIG. 2A is a block diagram of an FHT generator for performing a Fast Hadamard Transform in accordance with an embodiment of the invention.

FIG. 2A is a block diagram of FHT generator 100 for serially calculating a Fast Hadamard Transform according to an embodiment of the invention. The invention performs all calculations of a Hadamard Transform of size N upon an input sequence of arbitrary length N where $N=2^{2k}$ and $k \geq 0$. Note the Hadamard Transform H is always a square matrix hence the term in the exponent. In the foregoing descriptions the outputs of odd numbered stages are equivalent to a Hadamard Transform of size N. Even numbered stages are equivalent to rectangular matrix multiplication of size N rows and N/2 columns which is equivalent to half of the Hadamard Transform of size N. In another embodiment, the outputs of even numbered stages are equivalent to a Hadamard Transform of size N.

For purposes of illustration, FIG. 2A, depicts four stages for performing a Fast Hadamard Transform of size $N=0.2^4=16$. Each stage comprises a shift register 104-*n*, a two's complement generator 108-*n*, a 2:1 multiplexer 110-*n* and an adder 112-*n*, where n is the number of the stage. Each shift register 104-*n* has at least a first register 106-*n* and a last register 107-*n* and all but the first shift register 104-1 have additional intermediate registers. The contents of the first register 106-*n* of each shift register 104-*n* are provided as an input to adder 112-*n*. The contents of the last register 107-*n* of each shift register are provided as an input to both multiplexer 110-*n* and to two's complement generator 108-*n*. The output of the two's complement generator is provided as the second input to multiplexer 110-*n*. The output of multiplexer 110-*n* is provided as a second input to adder 112-*n*. A larger Fast Hadamard Transform is performed by adding more stages. For example, for IS-95 a 6 stage $FHT_{64}$ generator is used to perform a Fast Hadamard Transform of size $2^6=64$.

The combination of the two's complement generator, the multiplexor and the adder may alternatively be implemented as an adder/subtractor, the last register 107-*n* of the shift register 104-*n* will be either subtracted from or added to the first register 106-*n* of the shift register 104-*n*.

Figure 2B:
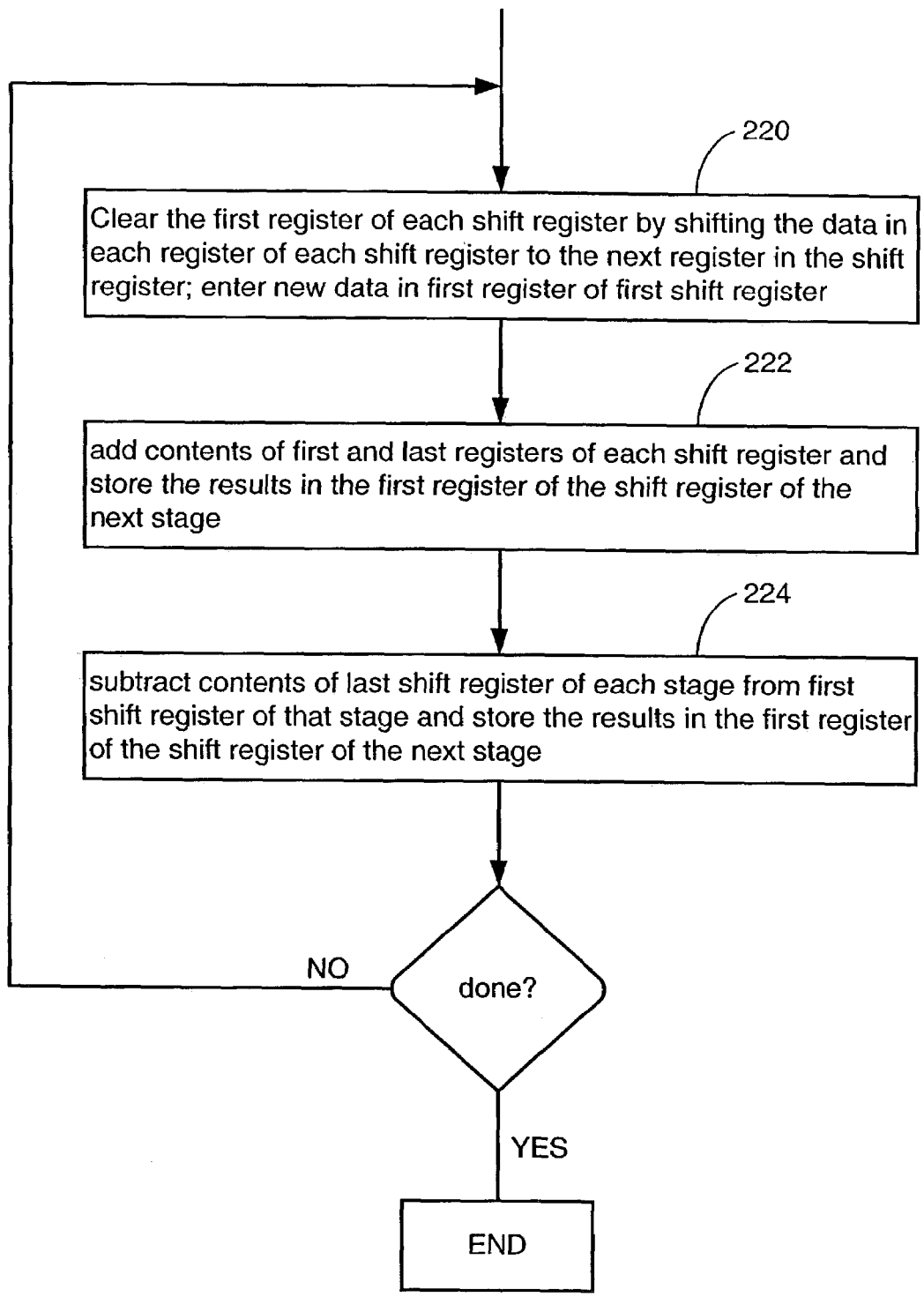
FIG. 2B is a flowchart of method for generating an FHT in accordance with the invention.

The sequence of operation of FHT generator 100 is depicted in FIG. 2B. To be able to accept new data, each of the shift registers is clocked at step 220 so as to shift the data in each register to the next register in the shift register. At the same time, data is entered into the first register 106-1 of the first shift register 104-1. Data in the last register of each shift register is overwritten in this process.

Next, at step 222 each adder adds the contents of the first and last registers of the shift register of its stage and stores the results in the first register of the shift register of the next stage. Then, at step 224 each adder subtracts the contents of the last shift register from the contents of the first shift register of its stage and stores the results in the first register of the next stage.

The Tables of FIGS. 2C-1 to 2C-4 illustrate the results of these operations over the first few stages of $FHT_{16}$ generator. In particular, each column of each Table represents one of the shift registers 104-*n* as identified by the entry in the first row at the top of the column and every other row in a column represents the contents of one of the registers in that shift register. One of skill in the art will understand how these operations can be extended to larger sizes including six stages.

To describe these operations, a data stream represented by A, B, C, D, E, F, G, H, I, J, K, L, M, N, O, P will be used where A is input first and P is input last chronologically in a stream. Therefore, the input vector, $x_{16}$, has 16 rows and 1 column and can be expressed as $$x_{16,t} = \begin{bmatrix} P \\ O \\ N \\ M \\ L \\ K \\ J \\ I \\ H \\ G \\ F \\ E \\ D \\ C \\ B \\ A \end{bmatrix} \quad (5)$$

The $FHT_{16}$ of size 16 is then equivalent to multiplication with the size 16 Hadamard matrix, $H_{16}$, and the input $x_{16}$. For reference, each row of the $H_{16}$ Hadamard matrix is numbered. Furthermore the $FHT_{16}$ is also equivalent to multiplication with a transformation of the $H_{16}$ Hadamard matrix denoted as $\Im(H_{16})$ in which the rows are re-ordered in a bitwise reversed fashion. Bit reversal is a function performed on a binary representation in which the most significant bits (MSB) are swapped with the least significant bits (LSB). For example, [0 0 1 1] is binary representation for 3 and binary 1's are in the LSB positions. A bit reversal is [1 1 0 0] which is a binary representation for the number 12 and binary 1's are swapped into the MSB positions.

| | Row sequence of $H_{16}$ | Bitwise reversal and Row sequence of $\Im(H_{16})$ |
|---|---|---|
| Row | 0 | 0 |
| Row | 1 | 8 |
| Row | 2 | 4 |
| Row | 3 | 12 |
| Row | 4 | 2 |
| Row | 5 | 10 |
| Row | 6 | 6 |
| Row | 7 | 14 |
| Row | 8 | 1 |
| Row | 9 | 9 |
| Row | 10 | 5 |
| Row | 11 | 13 |
| Row | 12 | 3 |
| Row | 13 | 11 |
| Row | 14 | 7 |
| Row | 15 | 15 |

$$y_{16} = H_{16} \cdot x_{16}$$

$$= \begin{bmatrix} +1 & +1 & +1 & +1 & +1 & +1 & +1 & +1 & +1 & +1 & +1 & +1 & +1 & +1 & +1 & +1 \\ +1 & -1 & +1 & -1 & +1 & -1 & +1 & -1 & +1 & -1 & +1 & -1 & +1 & -1 & +1 & -1 \\ +1 & +1 & -1 & -1 & +1 & +1 & -1 & -1 & +1 & +1 & -1 & -1 & +1 & +1 & -1 & -1 \\ +1 & -1 & -1 & +1 & +1 & -1 & -1 & +1 & +1 & -1 & -1 & +1 & +1 & -1 & -1 & +1 \\ +1 & +1 & +1 & +1 & -1 & -1 & -1 & -1 & +1 & +1 & +1 & +1 & -1 & -1 & -1 & -1 \\ +1 & -1 & +1 & -1 & -1 & +1 & -1 & +1 & +1 & -1 & +1 & -1 & -1 & +1 & -1 & +1 \\ +1 & +1 & -1 & -1 & -1 & -1 & +1 & +1 & +1 & +1 & -1 & -1 & -1 & -1 & +1 & +1 \\ +1 & -1 & -1 & +1 & -1 & +1 & +1 & -1 & +1 & -1 & -1 & +1 & -1 & +1 & +1 & -1 \\ +1 & +1 & +1 & +1 & +1 & +1 & +1 & +1 & -1 & -1 & -1 & -1 & -1 & -1 & -1 & -1 \\ +1 & -1 & +1 & -1 & +1 & -1 & +1 & -1 & -1 & +1 & -1 & +1 & -1 & +1 & -1 & +1 \\ +1 & +1 & -1 & -1 & +1 & +1 & -1 & -1 & -1 & -1 & +1 & +1 & -1 & -1 & +1 & +1 \\ +1 & -1 & -1 & +1 & +1 & -1 & -1 & +1 & -1 & +1 & +1 & -1 & -1 & +1 & +1 & -1 \\ +1 & +1 & +1 & +1 & -1 & -1 & -1 & -1 & -1 & -1 & -1 & -1 & +1 & +1 & +1 & +1 \\ +1 & -1 & +1 & -1 & -1 & +1 & -1 & +1 & -1 & +1 & -1 & +1 & +1 & -1 & +1 & -1 \\ +1 & +1 & -1 & -1 & -1 & -1 & +1 & +1 & -1 & -1 & +1 & +1 & +1 & +1 & -1 & -1 \\ +1 & -1 & -1 & +1 & -1 & +1 & +1 & -1 & -1 & +1 & +1 & -1 & +1 & -1 & -1 & +1 \end{bmatrix} \cdot \begin{bmatrix} P \\ O \\ N \\ M \\ L \\ K \\ J \\ I \\ H \\ G \\ F \\ E \\ D \\ C \\ B \\ A \end{bmatrix}$$

(6)

$$= \begin{bmatrix} \text{row } 0 \\ \text{row } 1 \\ \text{row } 2 \\ \text{row } 3 \\ \text{row } 4 \\ \text{row } 5 \\ \text{row } 6 \\ \text{row } 7 \\ \text{row } 8 \\ \text{row } 9 \\ \text{row } 10 \\ \text{row } 11 \\ \text{row } 12 \\ \text{row } 13 \\ \text{row } 14 \\ \text{row } 15 \end{bmatrix} \cdot \begin{bmatrix} P \\ O \\ N \\ M \\ L \\ K \\ J \\ I \\ H \\ G \\ F \\ E \\ D \\ C \\ B \\ A \end{bmatrix}$$

$$\Im(H_{16}) = \begin{bmatrix} \text{row } 0 \\ \text{row } 8 \\ \text{row } 4 \\ \text{row } 12 \\ \text{row } 2 \\ \text{row } 10 \\ \text{row } 6 \\ \text{row } 14 \\ \text{row } 1 \\ \text{row } 9 \\ \text{row } 5 \\ \text{row } 13 \\ \text{row } 3 \\ \text{row } 11 \\ \text{row } 7 \\ \text{row } 15 \end{bmatrix}$$

(7)

FIGS. 2C-1 to 2C-4 depicts the flow of valid computations of $\Im(H_{16})$ for illustration purposes. Certain subsets of inputs are shown with more tables in order to describe every required computation. The tables of FIGS. 2C-1 to 2C-4 do not necessarily correspond to timing relationships of the computations since certain computations can be performed in parallel. One skilled in the art will understand how to implement the timings required for this embodiment. Furthermore, one skilled in the art will understand how to implement alternative timings which will change the depiction of data A, B, C, D, E, F, G, H, I, J K, L, M, N, O, P versus time in the tables of FIGS. 2C-1 to 2C-4.

Data A first enters the first stage shift register 104-1 at input 106-1. Table 2-1 of FIGS. 2C-1 shows the state of the various registers in the circuit of FIG. 2A after entry of data A and B at input 106-1. As shown in column 1, the first register of stage 1 shift register 104-1 contains the data A and data B. The contents of the other registers are unknown or uncontrolled and a lower case notation is used throughout FIGS. 2C-1 to 2C-4 to signify this. To accept new data, the shift registers are clocked at step 220; and data is shifted to the next register.

Since shift register 104-1 contains data in its first and last registers, valid $FHT_2$ computations can be made. A first computation (step 222) is to perform the addition of the data B in the first register of the first stage shift register 104-1 with the data A in the last register of the first stage shift register 104-1, the result being $y_{2(BA)}$, which is B+A. The result, $y_{2(BA)}$, is then entered into a first part of the first register of shift register 104-2. Table 2-1 shows the states of all registers when computation $y_{2(BA)}$ is computed and stored in 104-2. A second computation (step 224) is to perform the addition of the data B in the first register of shift-register 104-1 with the two's-complement of the data A in the last register of shift-register 104-1, the result being $y_{2(\overline{BA})}$ which is B−A. The bar over a term represents a 2's complement. To perform this computation, multiplexer 110-1 selects the output of two's complement generator 108-1, which is the negative of the contents of the last register of shift register 104-1, and supplies this output to adder 112-1; and adder 112-1 combines it with the output of the first stage of register 104-1. The result, $y_{2(\overline{BA})}$, is then entered into a second part of the first register of stage 2 shift-register 104-2. Table 2—2 shows the states of all registers when computation $y_{2(\overline{BA})}$ is computed and stored in 104-2. Thus, the first register of the second stage shift-register 104-2 contains the size N=2 Fast Hadamard Transform of data A and B.

Data C and D are subsequently entered into the first stage shift-register 104-1. When data D is shifted into the first register of the first stage shift register 104-1, the $FHT_2$ of size N=2 is performed again on the input D and C. The second register of the second stage shift register 104-2 is shifted to the last register of shift register 104-2. Specifically, a first computation (step 222) of $FHT_2$ is to perform the addition of the data D in the first register of the first stage shift register 104-1 with the data C in the last register of the first stage shift register 104-1, the result being D+C. The result, D+C, is then entered into a first part of the first register of shift register 104-2. The contents of 104-2 now contains sufficient data to perform computations for $FHT_4$. Valid computations can be performed on the contents of the second stage shift register 104-2 that are similar to those performed on the contents of the first stage shift register 104-1. In particular, sums and differences of $FHT_2$ results which are stored in first and last registers of the second stage shift register are used to generate computations of $FHT_4$. The $FHT_4$ computation $y_{4(DCBA)}$ is therefore produced from $FHT_2$ computations $y_{2(DC)}$ $y_{2(D\overline{C})}$ $y_{2(BA)}$ and $y_{2(\overline{BA})}$. The first computation of $FHT_4$ (step 222) is to perform an addition using adder 112-2. The previous stage result $y_{2(DC)}$ located at 106-2 in the first register of the shift register 104-2 is added to the previous stage result $y_{2(BA)}$ located in the last register 107-2 of the shift register 104-2, the result being $y_{4(DCBA)}$. The result is then entered into a first part of the first register of shift register 104-3. Table 2-3 shows the states of all registers when computation $y_{4(DCBA)}$ is stored in register 104-3 at location 106-3. The second computation of $FHT_4$ (step 224) is to perform a subtraction using the 2's complement 108-2 transformation of data located at 107-2. This complement is selected with multiplexor 110-2 such that the adder 112-2 computes the difference between $y_{2(DC)}$ and $y_{2(BA)}$, the result being $y_{4(DC\overline{BA})}$. The result is then entered into a first part of the first register of shift register 104-3. Table 2-4 shows the states of all registers when computation $y_{4(DC\overline{BA})}$ is stored in register 104-3 at location 106-3.

The second computation (step 244) of $FHT_2$ is to perform the subtraction between the data D in the first register of the first stage shift register 104-1 with the data C in the last register of the first stage shift register 104-1, the result being $y_{2(D\overline{C})}$ which is D−C. The result, $y_{2(D\overline{C})}$, is then entered into a first part of the first register of shift register 104-2. The third computation of $FHT_4$ (step 222) is to perform an addition using adder 112-2. The previous stage result $y_{2(D\overline{C})}$ located at 106-2 in the first register of the shift register 104-2 is added to the previous stage result $y_{2(\overline{BA})}$ located in the last register 107-2 of the shift register 104-2, the result being $y_{4(D\overline{C}\overline{BA})}$. The result is then entered into a first part of the first register of shift register 104-3. Table 2-5 shows the states of all registers when computation $y_{4(D\overline{C}\overline{BA})}$ is stored in register 104-3 at location 106-3.

The forth computation of $FHT_4$ (step 224) is to perform a subtraction using the 2's complement 108-2 transformation of data $y_{2(\overline{BA})}$ located at 107-2. This complement is selected with multiplexor 110-2 such that the adder 112-2 computes the difference between $y_{2(D\overline{C})}$ and $y_{2(\overline{BA})}$, the result being $y_{4(D\overline{C}\overline{BA})}$. The result is then entered into a first part of the first register of shift register 104-3. Table 2-6 shows the states of all registers when computation $y_{4(D\overline{CBA})}$ is stored in register 104-3 at location 106-3. Thus, the contents of the first, second, third and fourth parts of the first register of register 104-3 are all the computations of $FHT_4$ of data A, B, C and D and stored sequentially in the first register of the third stage shift register 104-3.

In similar fashion data E, F, G and H will enter FHT generator 100. Data E and F enters FHT generator 100 and is stored in the shift register 104-1. The computations of $FHT_2$ upon data E and F are performed again.

A first computation (step 222) is to perform the addition of the data E in the first register of the first stage shift register 104-1 with the data F in the last register of the first stage shift register 104-1, the result being $y_{2(FE)}$ which is E+F. The result, $y_{2(FE)}$, is then entered into a first part of the first register of shift register 104-2. Table 2-7 shows the states of all registers when computation $y_{2(FE)}$ is computed and stored in 104-2. A second computation (step 224) is to perform the addition of the data F in the first register of shift-register 104-1 with the two's-complement of the data E in the last register of shift-register 104-1, the result being $y_{2(F\overline{E})}$ which is F−E. To perform this computation, multiplexer 110-1 selects the output of two's complement generator 108-1, which is the negative of the contents of the last register of shift register 104-1, and supplies this output to adder 112-1; and adder 112-1 combines it with the output of the first stage of register 104-1. The result, $y_{2(F\overline{E})}$, is then entered into a second part of the first register of stage 2 shift-register 104-2. Table 2-8 shows the states of all registers when computation $y_{2(F\overline{E})}$ is computed and stored in 104-2.

Data G and H enters FHT generator 100 and is stored in the first register of the shift register 104-1. The computations of $FHT_2$ upon data G and H are performed again.

The elements of the results $y_{4(ABCD)}$ and $y_{4(EFGH)}$ stored in the first and last registers of the third stage shift register 104-3 can then be added together and subtracted one from the other to compute terms of $FHT_8$ of the data A, B, C, D, E, F, G and H. The first computation (step 222) results in $y_{8(HGFDCBA)}$ and the second (step 224) computation results in $y_{8(HGF\overline{DCBAA})}$. These computations are successively stored in the first register of the fourth stage shift register 104-4. Table 2-10 shows the states of all registers when computations $y_{8(HGFDCBA)}$ and $Y_{8(HGF\overline{DCBA})}$ are computed and stored in 104-4.

The remaining tables of FIGS. 2C-1 to 2C-4 show all remaining computations of $FHT_{16}$. The tables describe all computations performed on the 16 terms of the input sequence $x_{16}$.

The structure of stages 1,2,3,4 can be extended to generate larger size Fast Hadamard Transforms including a 6 stage FHT generator for producing a size N=$64^{th}$ Fast Hadamard Transform $FHT_{64}$. In such an embodiment, the various shift registers are configured to store the growing sets of data to be generated.

Figure 2D:
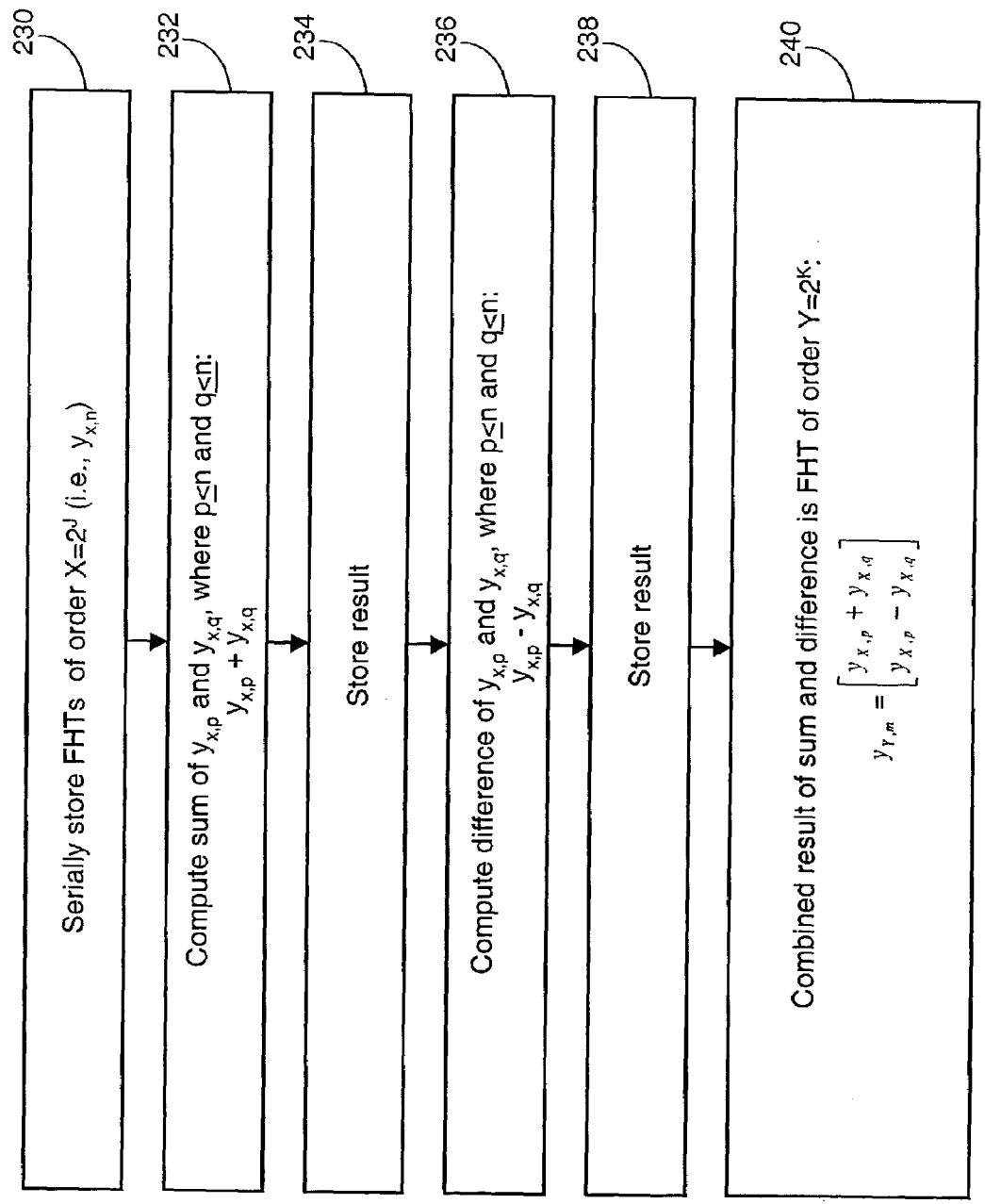
FIG. 2D is a flowchart of a method for generating an FHT of a size 2N from FHT computations of size N according to an embodiment of the invention.

FIG. 2D summarizes this method of generating an FHT. The method of FIG. 2D is used to generate an FHT, $y_{Y,m}$, of size $Y=2^K$ from FHTs of size $X=2^J$ where K>J. Note that the subscript m is used to keep track of the various Yth sized FHTs that will be generated. According to the method, a number of FHTs, $y_{X,n}$, of size $X=2^J$ are serially stored at step 230. In an embodiment of the invention, this number is equal to $S=2K-1$ where $Y=2^K$ is the size of the FHT being generated. Thus, for a IS-95 implementing a size $64=2^6$ FHT, it is necessary to store 11 (=2*6−1) FHT computations of size $32=2^5$. In order to implement the size $32=2^5$ FHTs, it is necessary to store 9 (=2*5−1) FHT computations of size $16=2^4$; and so on. Accordingly, the various stages 1 through 6 of an FHT generator implemented in accordance with the teachings of FIGS. 2A, 2B and 2C would require 2, 3, 5, 7, 9 and 11 storage locations. Proceeding with the method of FIG. 2D, a sum of FHTs $y_{X,p}$ and $y_{X,q}$ is computed at step 232. Here, $y_{X,p}$ and $y_{X,p}$ are selected from among the various $y_{X,n}$. The resulting sum is then stored at step 234. A difference between $y_{X,p}$ and $y_{X,q}$ is then computed at step 236. As discussed with reference to FIG. 2A, the difference operation can be performed by summing $y_{X,p}$ with the two's complement of $y_{X,q}$. The resulting difference is then stored at step 238. The stored sum and difference results provide an FHT, $y_{Y,m}$ of size $Y=2K$ having the form $$y_{Y,m} = \begin{bmatrix} y_{X,p} + y_{X,q} \\ y_{X,p} - y_{X,q} \end{bmatrix}. \tag{8}$$

Advantageously, the method of FIG. 2D can be applied repeatedly so as to generate an FHT from successively smaller sized FHTs. For example, the method of FIG. 2D was described to generate FHTs of size $64=2^6$ from FHTs of size 32=25. In similar fashion the method of FIG. 2D can be applied to generate FHTs of size $32=2^5$ from FHTs of size $16=2^4$. And so on for the generation of FHTs of size 16, 8, 4, and 2. Note that an FHT matrix of size 1 is a trivial matrix containing the value 1. Accordingly, an FHT of size 1 of a stream of data is the stream of data itself.

In another embodiment of the invention, the direction in which data is shifted through the shift-registers is reversed. The first register of each stage becomes 107-*n* and the last register becomes 106-*n*. Each shift register 104-*n* has at least a first register 107-*n* and a last register 106-*n* and all but the first shift register 104-1 have additional intermediate registers. New data is shifted into 107-*n* in the direction of 106-*n*. The contents of the last register 106-*n* of each shift register 104-*n* are provided as an input to adder 112-*n*. The contents of the first register 107-*n* of each shift register are provided as an input to both multiplexer 110-*n* and to two's complement generator 108-*n*. The output of the two's complement generator is provided as the second input to multiplexer 110-*n*. The output of multiplexer 110-*n* is provided as a second input to adder 112-*n*. This structure generates the FHT in the following form:

$$y_{16} = H_{16} \cdot x_{16} \tag{9}$$

$$= \begin{bmatrix} +1 & +1 & +1 & +1 & +1 & +1 & +1 & +1 & +1 & +1 & +1 & +1 & +1 & +1 & +1 & +1 \\ +1 & -1 & +1 & -1 & +1 & -1 & +1 & -1 & +1 & -1 & +1 & -1 & +1 & -1 & +1 & -1 \\ +1 & +1 & -1 & -1 & +1 & +1 & -1 & -1 & +1 & +1 & -1 & -1 & +1 & +1 & -1 & -1 \\ +1 & -1 & -1 & +1 & +1 & -1 & -1 & +1 & +1 & -1 & -1 & +1 & +1 & -1 & -1 & +1 \\ +1 & +1 & +1 & +1 & -1 & -1 & -1 & -1 & +1 & +1 & +1 & +1 & -1 & -1 & -1 & -1 \\ +1 & -1 & +1 & -1 & -1 & +1 & -1 & +1 & +1 & -1 & +1 & -1 & -1 & +1 & -1 & +1 \\ +1 & +1 & -1 & -1 & -1 & -1 & +1 & +1 & +1 & +1 & -1 & -1 & -1 & -1 & +1 & +1 \\ +1 & -1 & -1 & +1 & -1 & +1 & +1 & -1 & +1 & -1 & -1 & +1 & -1 & +1 & +1 & -1 \\ +1 & +1 & +1 & +1 & +1 & +1 & +1 & +1 & -1 & -1 & -1 & -1 & -1 & -1 & -1 & -1 \\ +1 & -1 & +1 & -1 & +1 & -1 & +1 & -1 & -1 & +1 & -1 & +1 & -1 & +1 & -1 & +1 \\ +1 & +1 & -1 & -1 & +1 & +1 & -1 & -1 & -1 & -1 & +1 & +1 & -1 & -1 & +1 & +1 \\ +1 & -1 & -1 & +1 & +1 & -1 & -1 & +1 & -1 & +1 & +1 & -1 & -1 & +1 & +1 & -1 \\ +1 & +1 & +1 & +1 & -1 & -1 & -1 & -1 & -1 & -1 & -1 & -1 & +1 & +1 & +1 & +1 \\ +1 & -1 & +1 & -1 & -1 & +1 & -1 & +1 & -1 & +1 & -1 & +1 & +1 & -1 & +1 & -1 \\ +1 & +1 & -1 & -1 & -1 & -1 & +1 & +1 & -1 & -1 & +1 & +1 & +1 & +1 & -1 & -1 \\ +1 & -1 & -1 & +1 & -1 & +1 & +1 & -1 & -1 & +1 & +1 & -1 & +1 & -1 & -1 & +1 \end{bmatrix} \cdot \begin{bmatrix} A \\ B \\ C \\ D \\ E \\ F \\ G \\ H \\ I \\ J \\ K \\ L \\ M \\ N \\ O \\ P \end{bmatrix}$$

$$= \begin{bmatrix} \text{row } 0 \\ \text{row } 1 \\ \text{row } 2 \\ \text{row } 3 \\ \text{row } 4 \\ \text{row } 5 \\ \text{row } 6 \\ \text{row } 7 \\ \text{row } 8 \\ \text{row } 9 \\ \text{row } 10 \\ \text{row } 11 \\ \text{row } 12 \\ \text{row } 13 \\ \text{row } 14 \\ \text{row } 15 \end{bmatrix} \cdot \begin{bmatrix} A \\ B \\ C \\ D \\ E \\ F \\ G \\ H \\ I \\ J \\ K \\ L \\ M \\ N \\ O \\ P \end{bmatrix}$$

Figure 3:
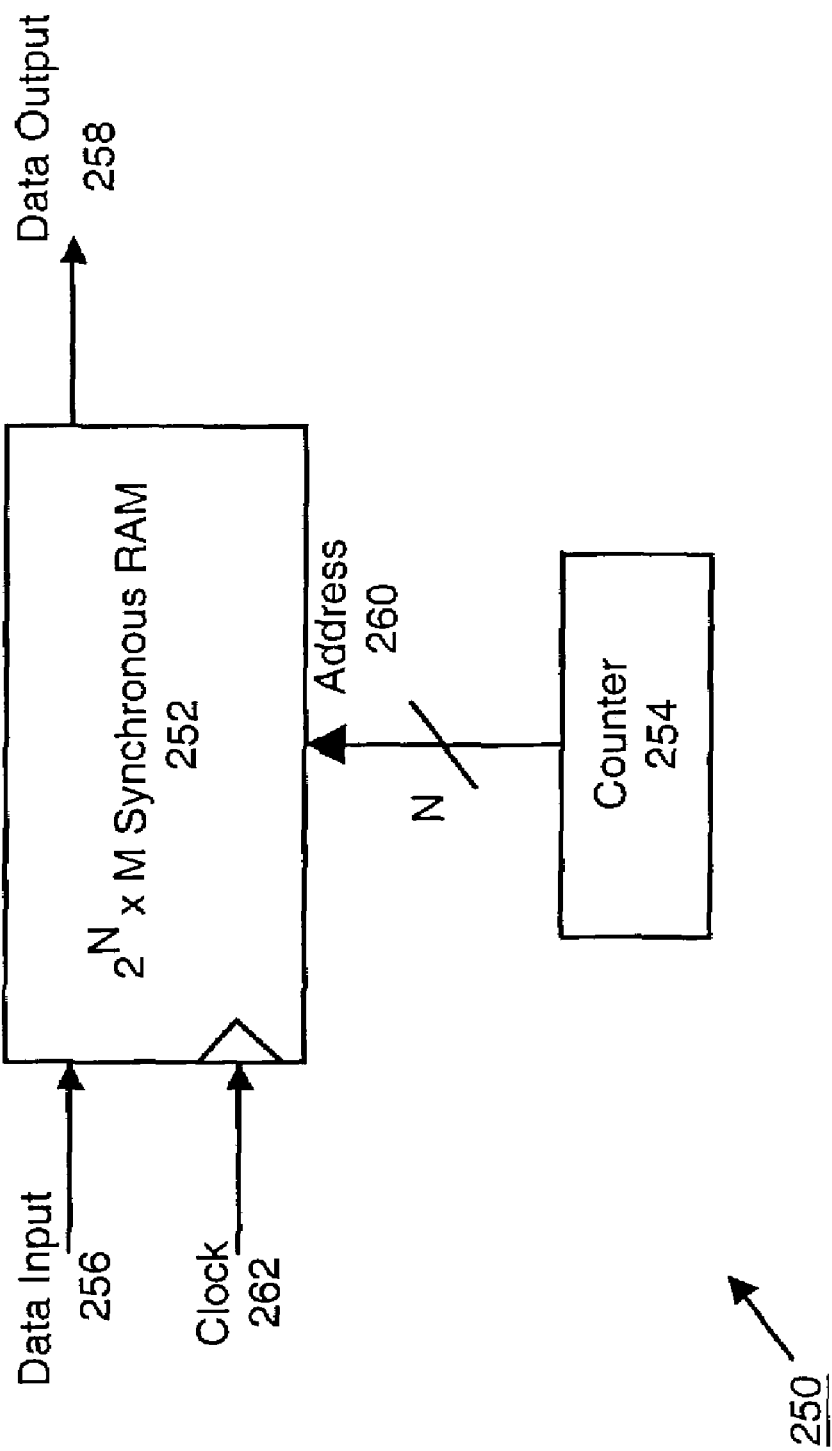

In another embodiment of the invention, the operation of the shift-registers is replaced by iteratively addressed random access memory (RAM). In this manner, data is not actually shifted but rather addressed as necessary. As shown in FIG. 3, RAM-based shift register 250 is implemented through the use of RAM 252 and counter 254. Counter 254 has N output lines connected to the address input 260 of synchronous RAM 252. Synchronous RAM 252 has $2N$ memory locations with M-bit values for each memory location. RAM 252 is configured such that when a memory location is addressed, data at the addressed memory location is made available at data output 258. Moreover, RAM 252 is configured such that data at data input 256 is stored at the addressed memory location. The simultaneous read and write operations just described can be achieved without errors using flip-flops at data output 258. As is widely known in the art, flip-flops have the very important characteristic that a new data state can be written in at the same time that an old data state is being read out. Counter 254 is configured to cycle through a predetermined number of unique states. For example, counter 254 can be configured to cycle through all the states needed to transfer data among the 2, 3, 5, 7, 9, 11 memory locations as if the apparatus of FIG. 3 were used in a straightforward replacement of stages 1 through 6 of FHT generator 100.

Essentially, the apparatus of FIG. 3 uses a set of RAM locations as a shift register. For example, to replace shift register 104-1, RAM-based shift register 250 requires two (2) memory locations and a counter with two (2) states. As data comes into RAM-based shift register, such data is sequentially stored at one of the two memory locations. A sum of the data at the two memory locations is then computed just as at step 232 and stored at a third memory location as at step 234; and a difference of the data at the two memory locations is computed as at step 236 and stored at a fourth memory location as at step 238. Recall that in shift register 104-2 of FIG. 2, the storage elements of the shift register have a first and second parts for storing a sum and a difference. The increased memory requirements are achieved by using two sets of memory locations within RAM-based shift register 250 each having three memory locations. One set of memory locations includes the third memory location and is configured to store the sum during a first clock cycle and the second set of memory locations includes the fourth memory location and is configured to store the difference during a second clock cycle. Advantageously, the sum and difference values in the two sets of memory locations are subsequently processed in parallel. This manner of using RAMs in parallel widens the RAM output. Where one RAM output has M-bit values, two RAMs in parallel have 2*M-bit values. These principles are extended to the other stages such that four (4) sets of memory locations with 5 memory locations each are required at stage 3; eight (8) sets of memory locations with 7 memory locations each are required at stage 4; and so on. Those of skill in the art will understand that other addressing schemes as well as other configurations can be implemented to use as a RAM-based shift register.

Figure 4:
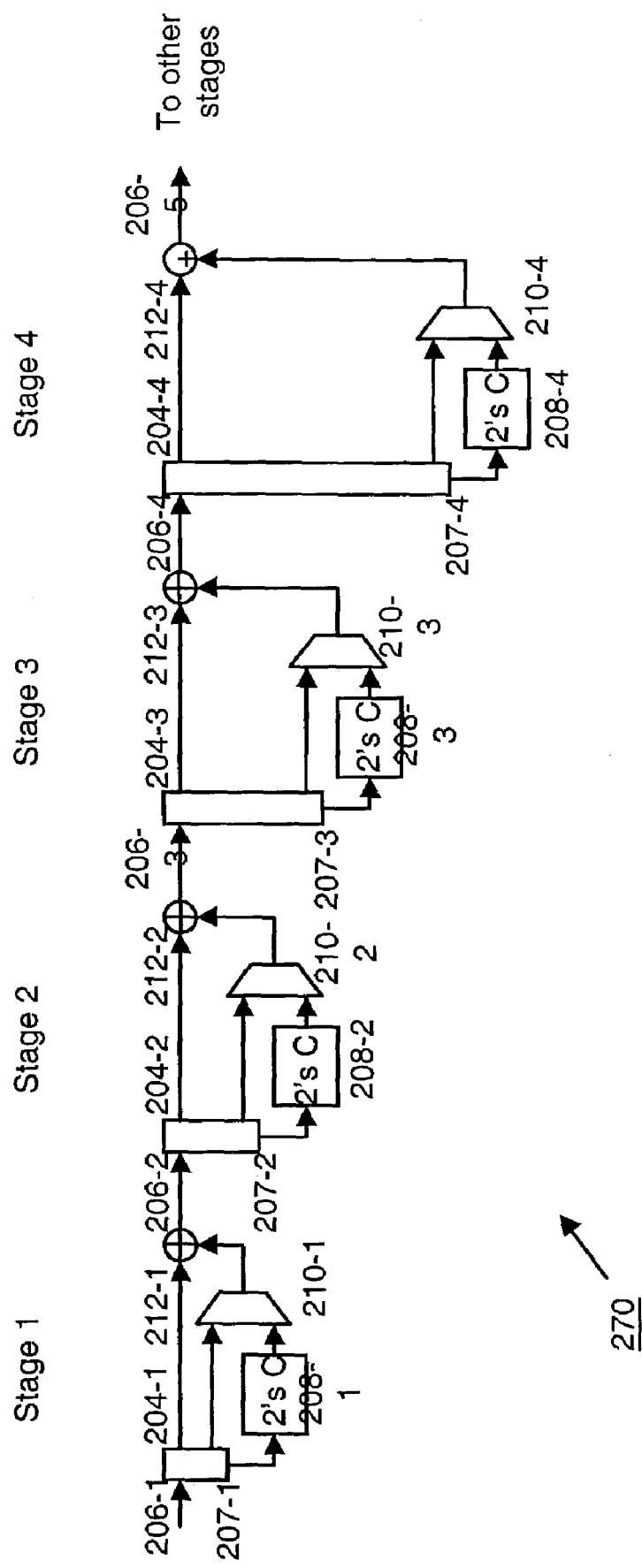

Instead of using a single RAM-based shift register 250 to calculate the FHT, separate RAM-based shift registers can be used at each stage. FIG. 4 is a block diagram of a FHT generator 270 for performing a serial Fast Hadamard Transform using four stages of RAM-based shift registers, 204-$n$, where n is the number of the stage, configured to operate in the manner of RAM-based shift register 250. RAM-based shift registers 204-$n$ are configured to store the same information as shift registers 104-$n$ of FIG. 2 and to operate in analogous fashion and analogous elements of FIG. 4 bear the same number as the corresponding element of FIG. 2 increased by 100. Thus, in operation, FHT generator 270 receives data at input 206-1 just as FHT generator 100 of FIG. 2 received data at input 106-1; and adders 212-$n$ generate sums and differences of the values at the first and last memory locations of each RAM based shift register 204-$n$.

Just as for FHT generator 100, FHT generator 270 can be extended to more stages so as to generate larger sized FHT results. Other embodiments of the invention utilize a combination of shift registers 104-$n$ in the lower stages and RAM-based shift registers 204-$n$ in the higher stages. For example, the memory requirements for stages 1 and 2 may be met by actual shift registers while larger-memory requirements such as for those of stages 3 and above may be met through the use of RAM.

Figure 5:
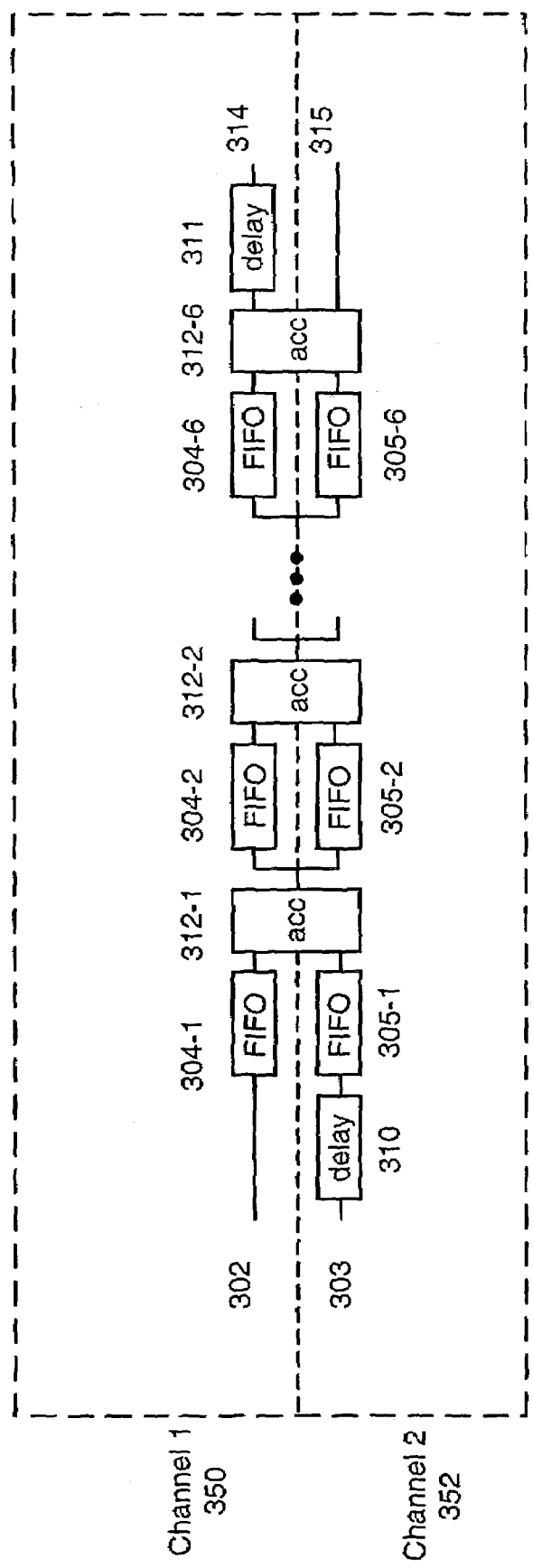
FIG. 5 is a block diagram of an FHT generator for performing a Fast Hadamard Transform implemented using FIFO and accumulator blocks in accordance with an embodiment of the invention.

In accordance with another embodiment of the invention, dual FHT generators can be implemented so as to share accumulators. FIG. 5 shows a dual FHT generator 300 that performs a size $64^{th}$, 10 bit Fast Hadamard Transform on two independent channels using 6 levels of additions performed in six stages of FIFO (First In, First Out) registers 304-1 through 304-6 and 305-1 through 305-6, and accumulators 312-1 through 312-6. FIFOs 304-$n$ are configured to operate similarly to shift registers 104-$n$ or RAM-based shift registers 204-$n$ of FIGS. 2A and 4, respectively. Accumulators 312-$n$ are configured to operate as adders 112-$n$ including the function of two's complement generators 108-$n$ of FIGS. 2A and 4. Dual FHT generator 300 performs the same functions as described for FHT generator 100 and 270 of FIGS. 2A and 4, respectively, while sharing critical hardware, importantly accumulators 312-1 through 312-6. Channel 1 input 302 provides input to channel 1 FHT generator 350 to generate channel 1 output 314; and channel 2 input 303 provides input to channel 2 FHT generator 352 to generate channel 2 output 315. The channel 1 and 2 inputs 302 and 303 are controlled such that a single accumulator block is shared between the two channels while meeting all throughput requirements. Essentially, the operation of accumulators 312-1 through 312-6 is fast enough to perform addition and subtraction operations for two separate channels. By doing so, the number of accumulators that perform add operations is reduced by 50% which provides a significant reduction in area on an integrated circuit. While hardware sharing is disclosed in FIG. 5 for two channels, the teachings of the invention can be extended to provide for additional hardware sharing for more than two channels as would be obvious to those of skill in the art.

In implementing dual FHT generator 300, four clock cycles occur for each input of data into channel 1 and 2 inputs 302 and 303. In one embodiment of the invention, add operations for channel 1 FHT generator 350 are performed in accumulators 312-1 through 312-6 during a first clock cycle and subtract operations for channel 1 FHT generator 350 are performed during a second clock cycle. During a third clock cycle, add operations for channel 2 FHT generator 352 are performed in accumulators 312-1 through 312-6 and subtract operations for channel 2 FHT generator 352 are performed during a fourth clock cycle. The add and subtract operations for a given channel are the same as were described for FIGS. 2 through 4. Sharing of accumulators 312-1 through 312-6 is accomplished by delaying the channel 2 input 303. Data on channel 2 input 303 is delayed at the input by two clock cycles using delay 310 such that accumulators 312-1 through 312-6 can operate on channel 2 data on the third and fourth clock cycles. Moreover, data on channel 1 is delayed at the output by two clock cycles using delay 311 such that channel 1 and channel 2 FHT data are output with the same timing at channel outputs 314 and 315.

Figure 6:
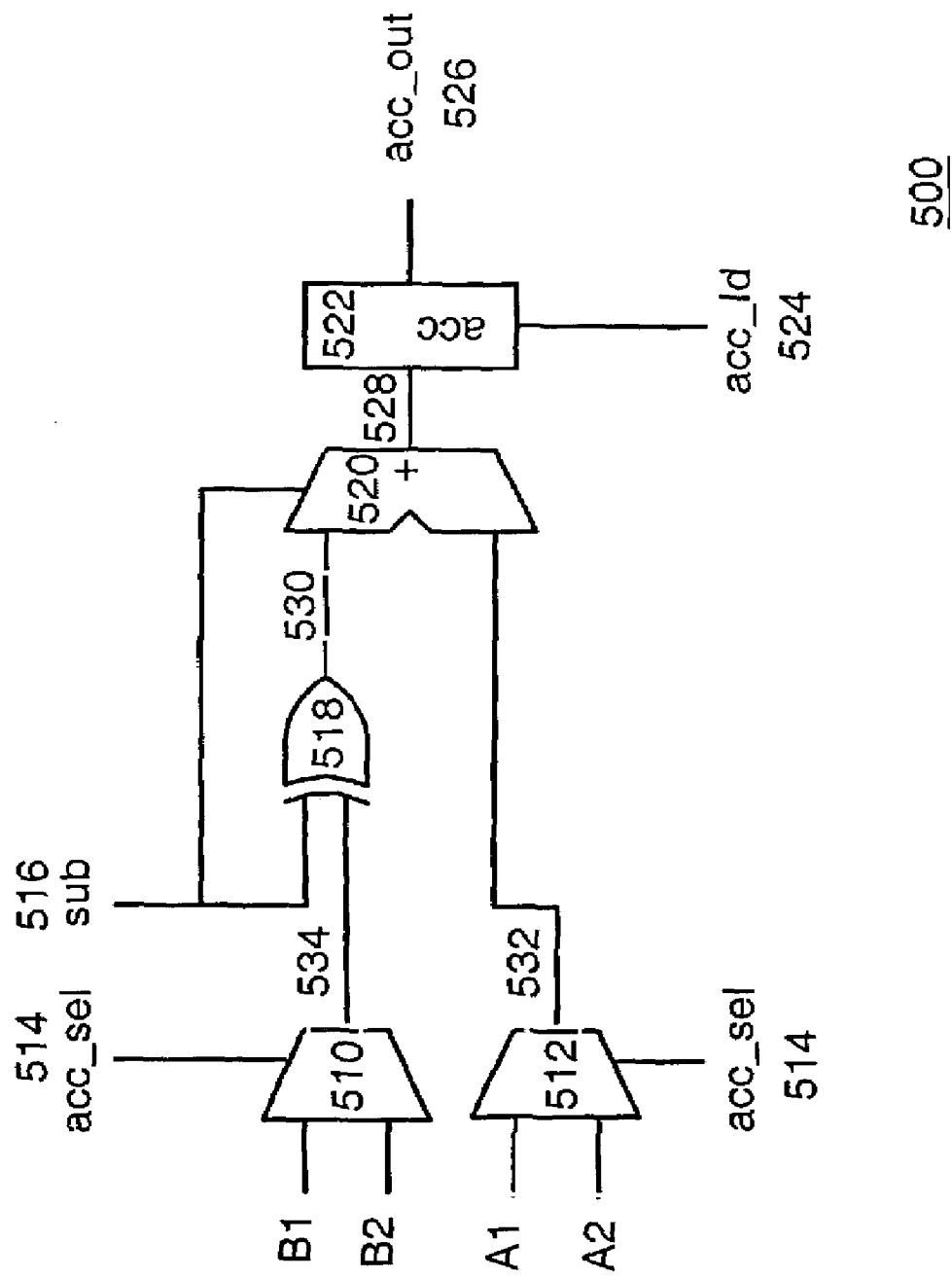
FIG. 6 is a block diagram of an accumulator block in accordance with an embodiment of the invention.

A particular implementation of accumulators 312-$n$ of FIG. 5 is shown in FIG. 6 as accumulator 500. Accumulator 500 receives signals B1 and A1 corresponding to channel 1 and also receives signals B2 and A2 corresponding to channel 2. Multiplexer 510 selects between B1 and B2 and multiplexer 512 selects between A1 and A2. Accumulator select signal 514 controls which channel data is passed through multiplexers 510 and 512. In a first clock cycle when signals B1 and A1 corresponding to channel 1 are selected, subtract select line 516 is set low indicating that the accumulator is to perform an add operation. Thus, B1 data is passed to adder input 530 and A1 data is passed to adder input 532. Adder 520 then produces the sum of the two signals B1+A1 at adder output line 528. This signal is then loaded into accumulator buffer 522 upon the occurrence of a high signal at accumulator load line 524. The sum of the two signals B1+A1 is then available at accumulator output line 526.

In a second clock cycle when signals B1 and A1 are also selected, subtract select line 516 is set high indicating that the accumulator is to perform a subtract operation. The subtract operation is performed by generating the two's complement of signal B1 through the use of XOR 518 and the resulting signal is then passed to adder input 530. A1 data is passed to adder input 532. Adder 520 then produces the difference of the two signals A1−B1 at adder output line 528. This signal is then loaded into accumulator buffer 522 upon the occurrence of a high signal at accumulator load line 524. The difference of the two signals A1−B1 is then available at accumulator output line 526.

Similar add and subtract operations are performed on signals B2 and A2 corresponding to channel 2 during third and fourth clock cycles where multiplexers 510 and 512 select the second data channel. Because the FHT blocks that are shared include most of the major data path components including FIFOs and accumulators as required in an FHT, a significant reduction in hardware is achieved. During an FHT calculation, unnecessary data is discarded as the FHT proceeds, which reduces the amount of memory required for FHT calculation. When the system clock is faster than the rate at which samples arrive, which is typically the case, circuitry in one stage is preferably shared with other stages such that idle circuitry is minimized.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. In a signal processing device, a method for serially calculating a Fast Hadamard Transform of size N of a first order of a sampled signal from a first channel, the method comprising:

serially storing a plurality of sampled Hadamard Transform signals of a size M of a second order, the size M of the second order being less than the size N of the first order;

computing a sum of two computations from a first sampled Hadamard Transform signal of size M and a second sampled Hadamard Transform signal from the plurality of sampled Hadamard Transform signals of the second order;

storing the sum;

computing a difference of two computations from the first sampled Hadamard Transform signal of size M and the second sampled Hadamard Transform signal from the plurality of sampled Hadamard Transform signals of the second order;

storing the difference; and combing the sum and the difference to form a sampled Hadamard Transform signal of size N of the sampled signal from the first channel, wherein the sampled signal from the first channel is representative of a wireless communication transmitted to the signal processing device.

2. The method of claim 1, wherein the sampled signal contains $2^N$ samples where N is an integer.

3. The method of claim 1, wherein the sum of computations from the first sampled Hadamard Transform signal of the second order and of the second sampled Hadamard Transform signal of the second order is computed during the same clock cycle and the difference of computations from the first sampled Hadamard Transform signal of the second order and the second sampled Hadamard Transform signal of the second order is computed during a second clock cycle.

4. The method of claim 1, wherein the sum of computations from the first sampled Hadamard Transform signal of the second order and of the second sampled Hadamard Transform signal of the second order is computed during the same clock cycle and the difference of computations from the first sampled Hadamard Transform signal of the second order and the second sampled Hadamard Transform signal of the second order is computed during the same clock cycle.

5. The method of claim 1, wherein the size N of the first order is of the form $2^K$ and the size M of the second order is of the form $2^J$, wherein K is greater than J.

6. The method of claim 1, wherein computing the difference of computations from the first sampled Hadamard Transform signal of the second order and the second sampled Hadamard Transform signal of the second order comprises the step of computing a sum of the first sampled Hadamard Transform signal of the second order and a two's complement of the second sampled Hadamard Transform signal of the second order.

7. The method of claim 1, wherein sampled Hadamard Transform signals of size order one (N=1) are samples from the sampled signal.

8. The method of claim 1, wherein the sampled Hadamard Transform signals of the second order are serially calculated using a method comprising the steps of:

serially storing a plurality of sampled Hadamard Transform signals of a third order, the third order being less than the second order;

computing a sum of a first sampled Hadamard Transform signal and a second sampled Hadamard Transform signal from the plurality of sampled Hadamard Transform signals of the third order;

storing the sum;

computing a difference of the first sampled Hadamard Transform signal and the second sampled Hadamard Transform signal from the plurality of sampled Hadamard Transform signals of the third order; and storing the difference.

9. The method of claim 8, wherein computing a difference of the first sampled Hadamard Transform signal of the third order and the second sampled Hadamard Transform signal the third order comprises the step of computing a sum of the first sampled Hadamard Transform signal of the third order and a two's complement of the second sampled Hadamard Transform signal of the third order.

10. The method of claim 8, wherein sampled Hadamard Transform signals of order one (1) are samples from the sampled signal.

11. The method of claim 8, wherein the sampled signal contains $2^N$ samples where N is an integer.

12. The method of claim 8, wherein the sum of the first sampled Hadamard Transform signal of the third order and the second sampled Hadamard Transform signal of the third order is computed during a first clock cycle and the difference of the first sampled Hadamard Transform signal of the third order and the second sampled Hadamard Transform signal of the third order is computed during a second clock cycle.

13. The method of claim 8, wherein the sum of the first sampled Hadamard Transform signal of the third order and the second sampled Hadamard Transform signal of the third order is computed during the same clock cycle and the difference of the first sampled Hadamard Transform signal of the third order and the second sampled Hadamard Transform signal of the third order is computed during the same clock cycle.

14. The method of claim 8, wherein the first order is of the form $2^K$ and the second order is of the form $2^J$ and the third order is of the form $2^I$, wherein K is greater than J which is greater than I.

15. The method of claim 1, wherein the steps of computing and storing sums and differences are applied repeatedly to produce sampled Fast Hadamard Transform signals of successively greater size order.

16. The method of claim 15, wherein the steps of computing and storing sums and differences are first applied to samples of the sampled signal.

17. The method of claim 1, wherein each of the sampled Hadamard Transform signals is bit-reverse-ordered to produce a transformation of the sampled Hadamard Transform signal.

18. The method of claim 17, wherein all terms of each of the transformations of the sampled Hadamard Transform signals have a one to one correspondence to terms of the sampled Hadamard Transform signals.

19. The method of claim 17, wherein all rows of each of the transformations of the sampled Hadamard Transform signals have a one-to-one correspondence to rows of sampled Hadamard Transform signals.

20. The method of claim 1, wherein the size N is of the form $2^K$ and the size M is of the form $2^J$, wherein K=1 and J=0.

21. The method of claim 1, wherein the size N is of the form $2^K$ and the size M is of the form $2^J$, wherein K=2 and J=1.

22. An apparatus for serially calculating a Fast Hadamard Transform of a sampled signal from a first channel, comprising:

a first shift register for serially receiving samples of the signal;

a first two's complement generator for producing a two's complement of a first sample of the signal;

a first multiplexer for selecting between a first sample of the signal and the two's complement of the signal to produce a multiplexer output; and a first adder for generating a sum of a second sample of the signal and the multiplexer output.

23. The apparatus of claim 22, wherein the sampled signal contains $2^N$ samples where N is an integer.

24. The apparatus of claim 22, wherein the first adder generates a sum of a first sample of the signal and the second sample of a signal during a first clock cycle and wherein the first adder generates a difference of a first sample of the signal and the second sample of the signal during a second clock cycle.

25. The apparatus of claim 22, wherein the first adder generates a sum of a first sample of the signal and the second sample of a signal during the same clock cycle and wherein the first adder generates a difference of a first sample of the signal and the second sample of the signal during the same clock cycle.

26. The apparatus of claim 25, wherein the sum and the difference are passed to a second shift register.

27. The apparatus of claim 22, wherein the first shift register is a random access memory.

28. The apparatus of claim 22, wherein the first shift register is a FIFO.

29. The apparatus of claim 22, wherein the first adder is shared with a second channel.

30. The apparatus of claim 22 further comprising:

a second shift register for serially receiving the sum from the first adder;

a second two's complement generator for producing a two's complement of a signal stored in the second shift register;

a second multiplexer for selecting between a signal stored in the second shift register and the two's complement of said signal to produce a multiplexer output; and a second adder for generating a sum of another signal stored in the second shift register and the multiplexer output.

31. In a signal processing device, a method for serially calculating a Fast Hadamard Transform of a sampled signal from a first channel, the method comprising:

serially storing samples of the signal;

computing a first sum of a first sample of the signal and a last sample of the signal;

storing the first sum;

computing a second sum of a first sample of the signal and a two's complement of the last sample of the signal;

storing the second sum; and combining the first sum and the second sum to form a sampled Hadamard Transform signal of size N of the sampled signal from the first channel, wherein the sampled signal from the first channel is representative of a wireless communication transmitted to the signal processing device.

32. An apparatus for serially calculating a Fast Hadamard Transform of order size $2^N$ of a sampled signal from a first channel, comprising:

a first shift register for serially receiving computations from Hadamard Transforms of order size $2^{N-1}$;

a first two's complement generator for producing a two's complement of a first computation from a first Hadamard Transform of order size $2^{N-1}$ that is stored in the first shift register; and a first adder for generating a sum of a second computation from a Hadamard Transform of order size $2^{N-1}$ and the first Hadamard Transform of the order size $2^{N-1}$, the first adder also generating a sum of the second computation of the Hadamard Transform of order size $2^{N-1}$ and a two's complements of the first computation of a Hadamard Transform of order size $2^{N-1}$.

33. The apparatus of claim 32, further comprising a first multiplexer for selecting between the first Hadamard Transform of order size $2^{N-1}$ and the two's complements of the first Hadamard Transform of the order size $2^{N}$.

34. The apparatus of claim 32, further comprising a second shift register for serially receiving Hadamard Transforms of order size $2^{N}$.

35. The apparatus of claim 32, wherein the sampled signal contains $2^{N}$ samples where N is an integer.

36. The apparatus of claim 32, wherein the sum of the second Hadamard Transform of order size $2^{N-1}$ and the first Hadamard Transform of order size $2^{N-1}$ is generated during a first clock cycle and wherein the sum of the second Hadamard Transform of order size $2^{N-1}$ and the two's complements of the first Hadamard Transform of order size $2^{N-1}$ is generated during a second clock cycle.

37. The apparatus of claim 32, wherein the sum of the second Hadamard Transform of order size $2^{N-1}$ and the first Hadamard Transform of order size $2^{N-1}$ is generated during the same clock cycle and wherein the sum of the second Hadamard Transform of order size $2^{N-1}$ and the two's complements of the first Hadamard Transform of order size $2^{N-1}$ is generated during the same clock cycle.

38. The apparatus of claim 32, wherein the first shift register is a random access memory.

39. The apparatus of claim 32, wherein the first shift register is a FIFO register.

40. The apparatus of claim 32, wherein the first adder is shared with another channel.

41. In a signal processing device, a method for serially calculating a Fast Hadamard Transform of a sampled signal from a first channel, the method comprising:

serially storing samples of the signal;

computing a first sum of a second sample of the signal and a first sample of the signal;

storing the first sum;

computing a second sum of the second sample of the signal and a two's complement of the first sample of the signal;

storing the second sum; and combining the first sum and the second sum to form a sampled Hadamard Transform signal of size N of the sampled signal from the first channel, wherein the sampled signal from the first channel is representative of a wireless communication transmitted to the signal processing device.

42. The method of claim 41, further comprising storing the first and second sums in a memory.

43. The method of claim 41, wherein the sampled signal contains $2^{N}$ samples where N is an integer.

44. The method of claim 41, wherein the first sum is computed during a first clock cycle and the second sum is computed during a second clock cycle.

45. The method of claim 41, wherein the first sum is computed during the same clock cycle and the second sum is computed during the same clock cycle.

* * * * *

UNITED STATES PATENT AND TRADEMARK OFFICE
CERTIFICATE OF CORRECTION

PATENT NO. : 7,200,629 B2 Page 1 of 1
APPLICATION NO. : 10/338625
DATED : April 3, 2007
INVENTOR(S) : Joel D. Medlock It is certified that error appears in the above-identified patent and that said Letters Patent is hereby corrected as shown below:

Column 4, line 34, "outputs" should read --output--

Column 7, line J of the equation, "+1 +1 –1 –1 –1 –1 +1 –1 +1 +1 –1 –1 –1 –1 +1 +1" should read --+1 +1 –1 –1 –1 –1 +1 +1 +1 +1 –1 –1 –1 –1 +1 +1--

Column 10, line 48, page "$Y_8(\overline{HGFDCBAA})$" should read -- $Y_8(\overline{HGFDCBA})$ --

Column 12, line 5, "32=25" should read --$32=2^5$--

Signed and Sealed this

Nineteenth Day of June, 2007

JON W. DUDAS
*Director of the United States Patent and Trademark Office*